(12) United States Patent
Lindberg et al.

(10) Patent No.: US 7,711,519 B2
(45) Date of Patent: *May 4, 2010

(54) ANALYSIS SYSTEM

(75) Inventors: Stefan Lindberg, Strangnas (SE);
Hakan Hedlund, Strangnas (SE); Jim Kummelstam, Strangnas (SE); Jarl-Ove Lindberg, Strangnas (SE)

(73) Assignee: SPM Instrument AB, Strangnas (SE)

( * ) Notice: Subject to any disclaimer, the term of this patent is extended or adjusted under 35 U.S.C. 154(b) by 0 days.

This patent is subject to a terminal disclaimer.

(21) Appl. No.: 11/984,254

(22) Filed: Nov. 15, 2007

(65) Prior Publication Data

US 2008/0071500 A1   Mar. 20, 2008

Related U.S. Application Data

(62) Division of application No. 10/501,769, filed as application No. PCT/SE03/00088 on Jan. 20, 2003, now Pat. No. 7,313,484.

(60) Provisional application No. 60/384,118, filed on May 31, 2002.

(30) Foreign Application Priority Data

Jan. 18, 2002   (SE) ............................. 0200147
Jan. 25, 2002   (SE) ............................. 0200215

(51) Int. Cl.
 *G06F 11/30*   (2006.01)
(52) U.S. Cl. ..................................... 702/183
(58) Field of Classification Search .................. 702/183
 See application file for complete search history.

(56) References Cited

U.S. PATENT DOCUMENTS 3,848,112 A   11/1974   Weichselbaum et al.
3,902,052 A   8/1975   Amar et al.

(Continued)

FOREIGN PATENT DOCUMENTS

DE   33 14 005   2/1984

(Continued)

OTHER PUBLICATIONS

Symbol, PPT 4600 Series Pen Terminals with Integrated Scanners, Apr. 1996, 6 pages.

(Continued)

*Primary Examiner*—Aditya Bhat
(74) *Attorney, Agent, or Firm*—Young & Thompson

(57) ABSTRACT

An apparatus for analyzing the condition of a machine having a rotating shaft, comprising: at least one input for receiving measurement data from a sensor for surveying a measuring point of the machine, the measurement data being dependent on rotation of the shaft; a data processor for processing condition data dependent on the measurement data; the data processor performing a plurality of condition monitoring functions (F1, F2 Fn). At least one of the plurality of condition monitoring functions (F1, F2 Fn) is a restricted function having a disabled state and an enabled state; the disabled state prohibiting complete execution of the condition monitoring function, and the enabled sate allowing execution. The apparatus allows a limited amount of use of the at least one restricted condition monitoring function; and at least one of the plurality of condition monitoring functions (F1, F2, Fn) is an unrestricted function.

43 Claims, 15 Drawing Sheets

U.S. PATENT DOCUMENTS

| | | | |
|---|---|---|---|
| 3,913,084 A | 10/1975 | Bollinger et al. | |
| 4,121,574 A | 10/1978 | Lester | |
| 4,280,185 A | 7/1981 | Martin | |
| 4,408,285 A | 10/1983 | Sisson et al. | |
| 4,426,641 A * | 1/1984 | Kurihara et al. | 340/683 |
| 4,518,855 A | 5/1985 | Malak | |
| 4,520,674 A | 6/1985 | Canada et al. | |
| 4,530,240 A | 7/1985 | Board et al. | |
| 4,550,311 A | 10/1985 | Galloway et al. | |
| 4,559,828 A | 12/1985 | Liska | |
| 4,612,620 A | 9/1986 | Davis et al. | |
| 4,615,216 A | 10/1986 | Vykoupil | |
| 4,621,263 A | 11/1986 | Takenaka et al. | |
| 4,669,315 A | 6/1987 | Sato et al. | |
| 4,721,849 A | 1/1988 | Davis et al. | |
| 4,768,380 A | 9/1988 | Vermeiren et al. | |
| 4,800,512 A | 1/1989 | Busch | |
| 4,827,771 A | 5/1989 | Cary et al. | |
| 4,885,707 A | 12/1989 | Nichol et al. | |
| 5,162,725 A | 11/1992 | Hodson et al. | |
| 5,191,327 A | 3/1993 | Talmadge et al. | |
| 5,206,818 A | 4/1993 | Speranza | |
| 5,251,151 A | 10/1993 | Demjanenko et al. | |
| 5,257,208 A | 10/1993 | Brown et al. | |
| 5,319,962 A | 6/1994 | Kaminski et al. | |
| 5,335,186 A | 8/1994 | Tarrant | |
| 5,377,128 A | 12/1994 | McBean | |
| 5,379,643 A | 1/1995 | Taylor | |
| 5,430,663 A | 7/1995 | Judd et al. | |
| 5,479,359 A | 12/1995 | Rogero et al. | |
| 5,501,105 A | 3/1996 | Hernandez et al. | |
| 5,511,422 A | 4/1996 | Hernandez | |
| 5,515,266 A | 5/1996 | Meyer | |
| 5,517,183 A | 5/1996 | Bozeman et al. | |
| 5,530,343 A | 6/1996 | Bowers, III et al. | |
| 5,533,413 A | 7/1996 | Kobayashi et al. | |
| 5,544,073 A | 8/1996 | Piety et al. | |
| 5,555,457 A | 9/1996 | Campbell et al. | |
| 5,579,241 A | 11/1996 | Corby, Jr. et al. | |
| 5,584,796 A | 12/1996 | Cohen | |
| 5,586,305 A | 12/1996 | Eidson et al. | |
| 5,633,811 A | 5/1997 | Canada et al. | |
| 5,636,281 A | 6/1997 | Antonini | |
| 5,663,811 A | 9/1997 | Shimizu | |
| 5,808,903 A | 9/1998 | Schiltz et al. | |
| 5,850,556 A | 12/1998 | Grivna | |
| 5,870,699 A | 2/1999 | Canada et al. | |
| 5,956,658 A | 9/1999 | McMahon | |
| 5,992,237 A | 11/1999 | McCarty et al. | |
| 6,006,164 A | 12/1999 | McCarty et al. | |
| 6,078,874 A | 6/2000 | Piety et al. | |
| 6,115,676 A | 9/2000 | Rector et al. | |
| 6,202,491 B1 | 3/2001 | McCarty et al. | |
| 6,208,944 B1 | 3/2001 | Franke et al. | |
| 6,260,004 B1 | 7/2001 | Hays et al. | |
| 6,324,487 B1 | 11/2001 | Qian et al. | |
| 6,326,758 B1 | 12/2001 | Discenzo | |
| 6,346,807 B1 | 2/2002 | Slates | |
| 6,484,109 B1 | 11/2002 | Lofall | |
| 6,499,349 B1 | 12/2002 | Aronsson | |
| 6,516,304 B1 | 2/2003 | Yoshimura | |
| 6,557,752 B1 | 5/2003 | Yacoob | |
| 6,725,723 B2 | 4/2004 | Aronsson et al. | |
| 6,892,063 B2 | 5/2005 | Savolainen | |
| 6,915,235 B2 | 7/2005 | Reeves et al. | |
| 6,938,177 B1 | 8/2005 | Blemel | |
| 2001/0001136 A1 | 5/2001 | Aronsson | |
| 2002/0147693 A1 | 10/2002 | Banerjee et al. | |
| 2003/0110380 A1 | 6/2003 | Carolsfeld et al. | |
| 2005/0049801 A1 | 3/2005 | Lindberg et al. | |
| 2005/0071128 A1 | 3/2005 | Lindberg et al. | |

FOREIGN PATENT DOCUMENTS

| | | |
|---|---|---|
| DE | 3915126 | 11/1990 |
| DE | 43 34 472 | 4/1994 |
| DE | 44 27 880 | 2/1996 |
| EP | 0 194 333 | 9/1986 |
| EP | 0 905 601 | 3/1999 |
| EP | 0905601 A1 | 3/1999 |
| EP | 1 124 204 | 8/2001 |
| EP | 1148320 | 10/2001 |
| JP | 8-123868 | 5/1996 |
| WO | WO 95/00930 | 1/1995 |
| WO | WO 98/01831 | 1/1998 |
| WO | WO 99/05486 | 2/1999 |
| WO | 99/60351 A1 | 11/1999 |
| WO | 00/55585 A2 | 9/2000 |
| WO | 01/14835 A1 | 3/2001 |
| WO | WO 01/14835 | 3/2001 |

OTHER PUBLICATIONS

Dallas Semiconductor, DS2430A 256-Bit-1-Wire EEPROM, Apr. 3, 1995, pp. 235-250.

European Search Report in Corresponding Application 3701958.5 dated Nov. 24, 2009.

* cited by examiner

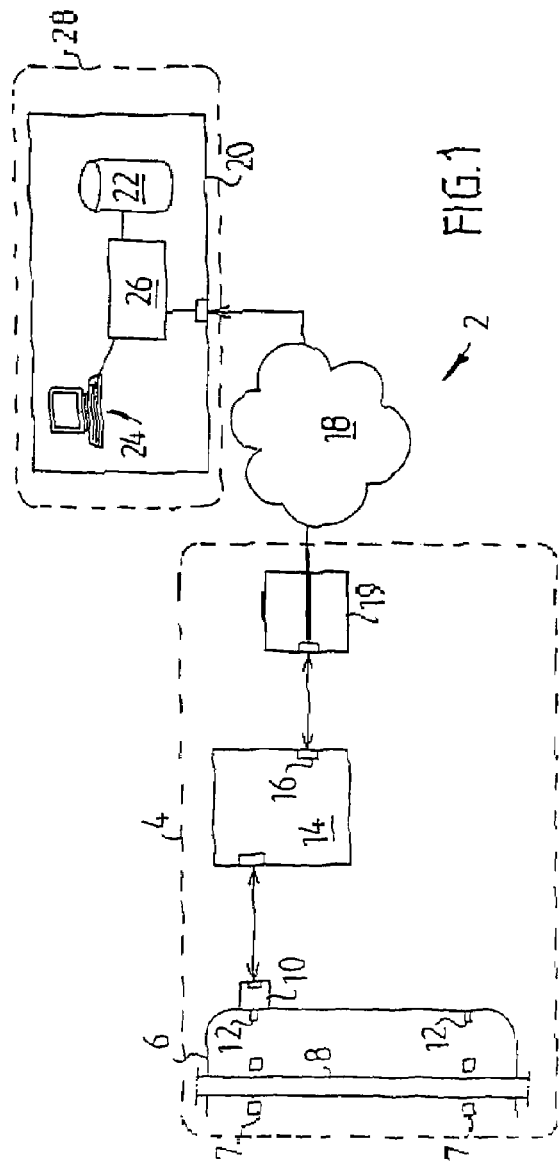
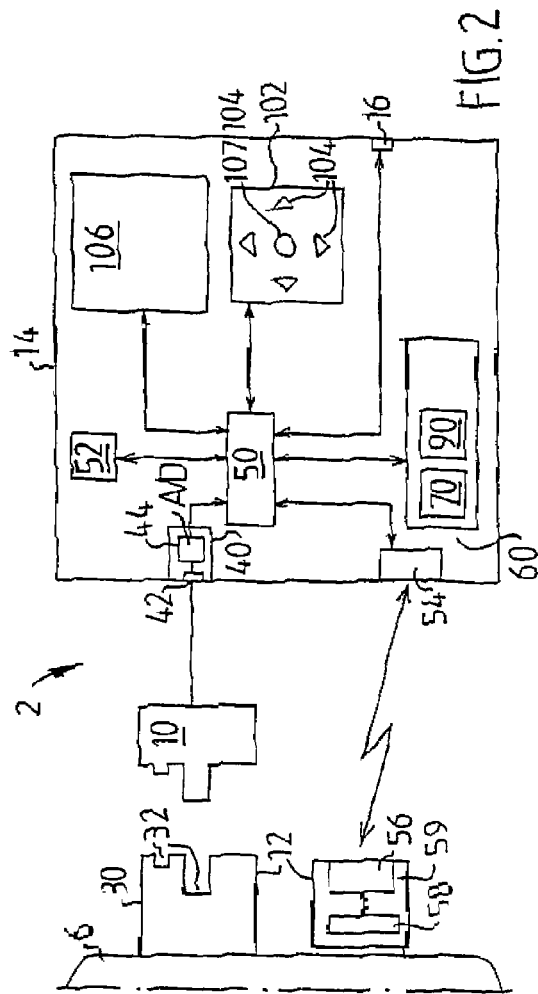

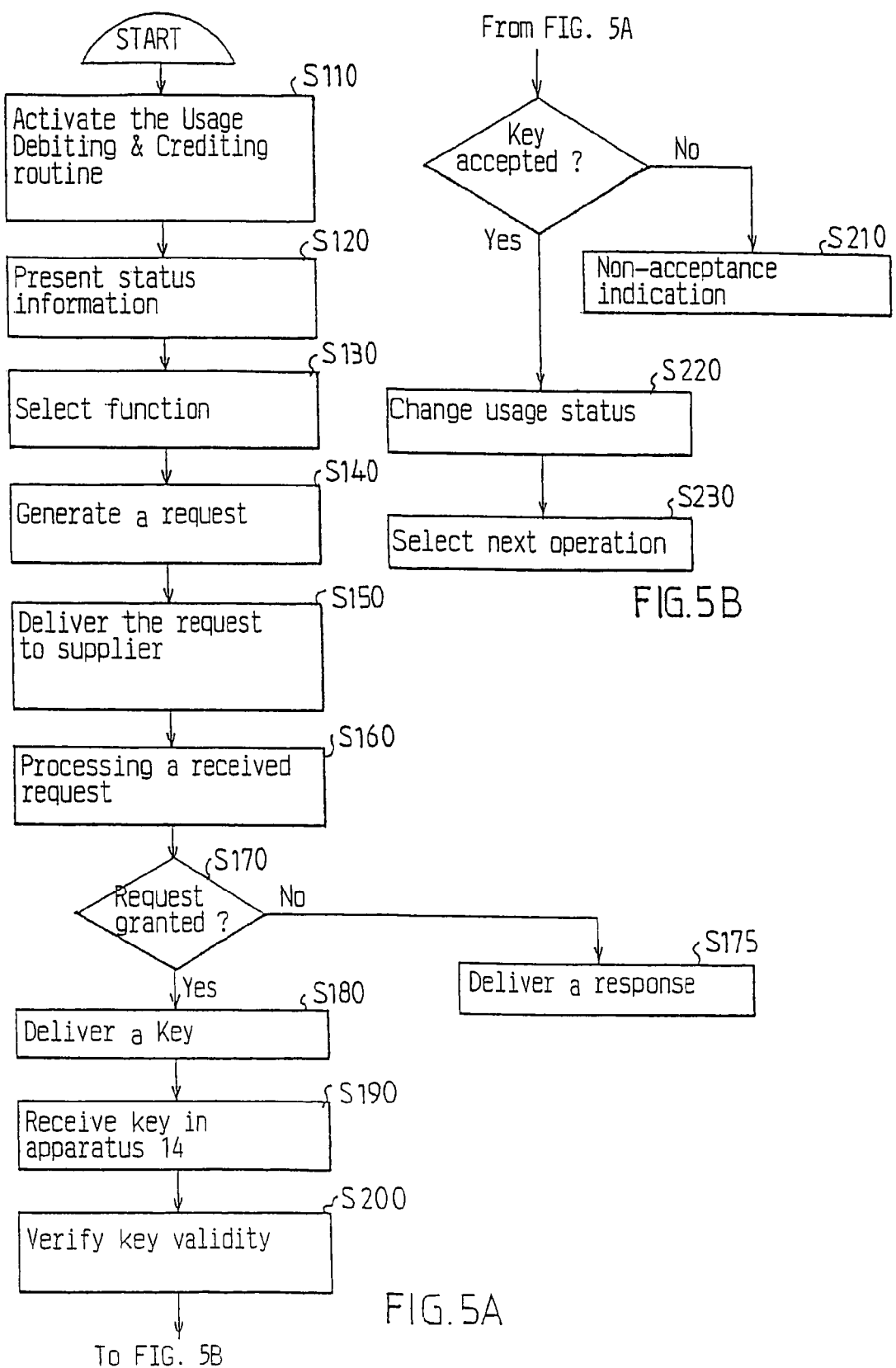

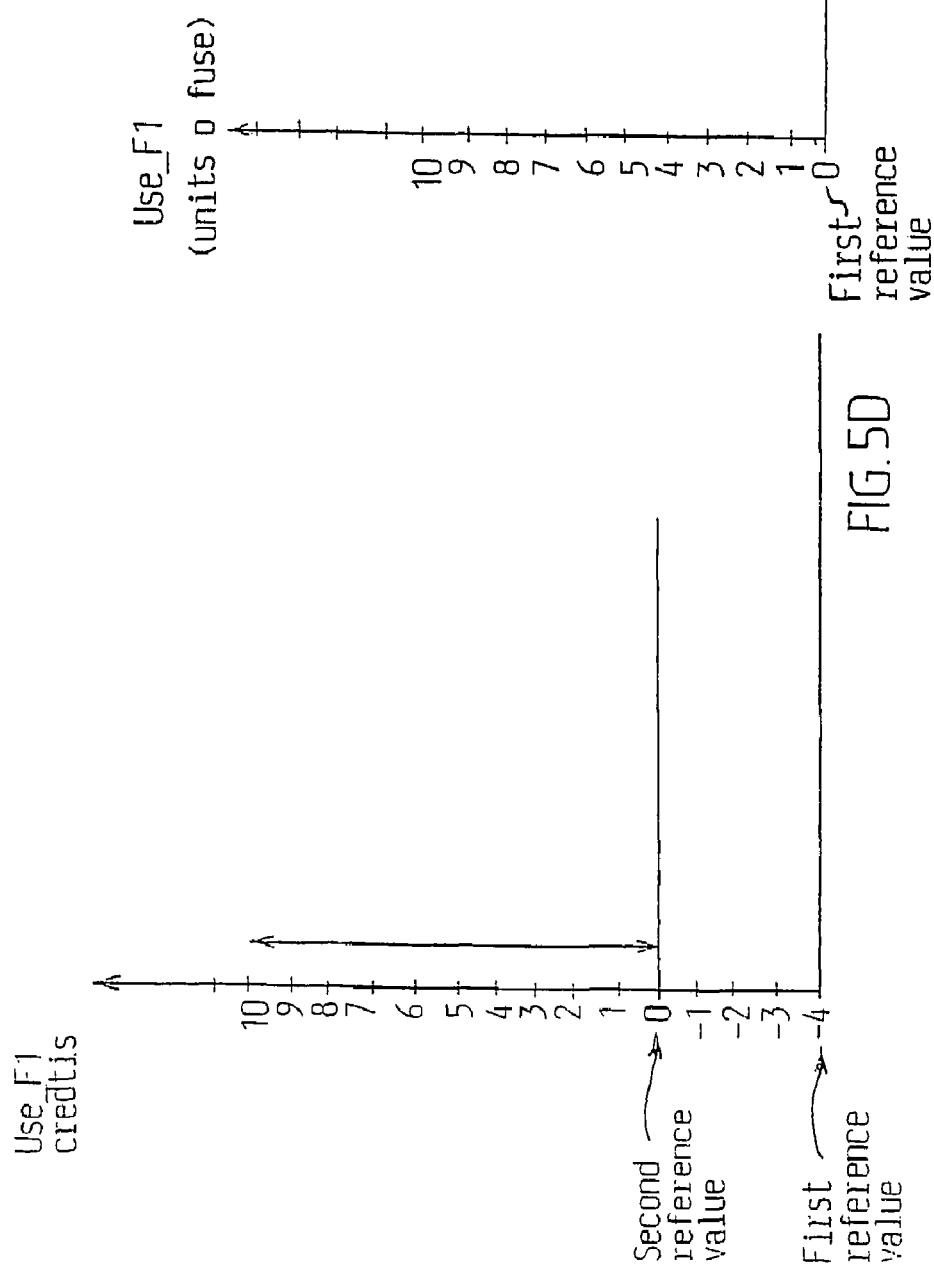

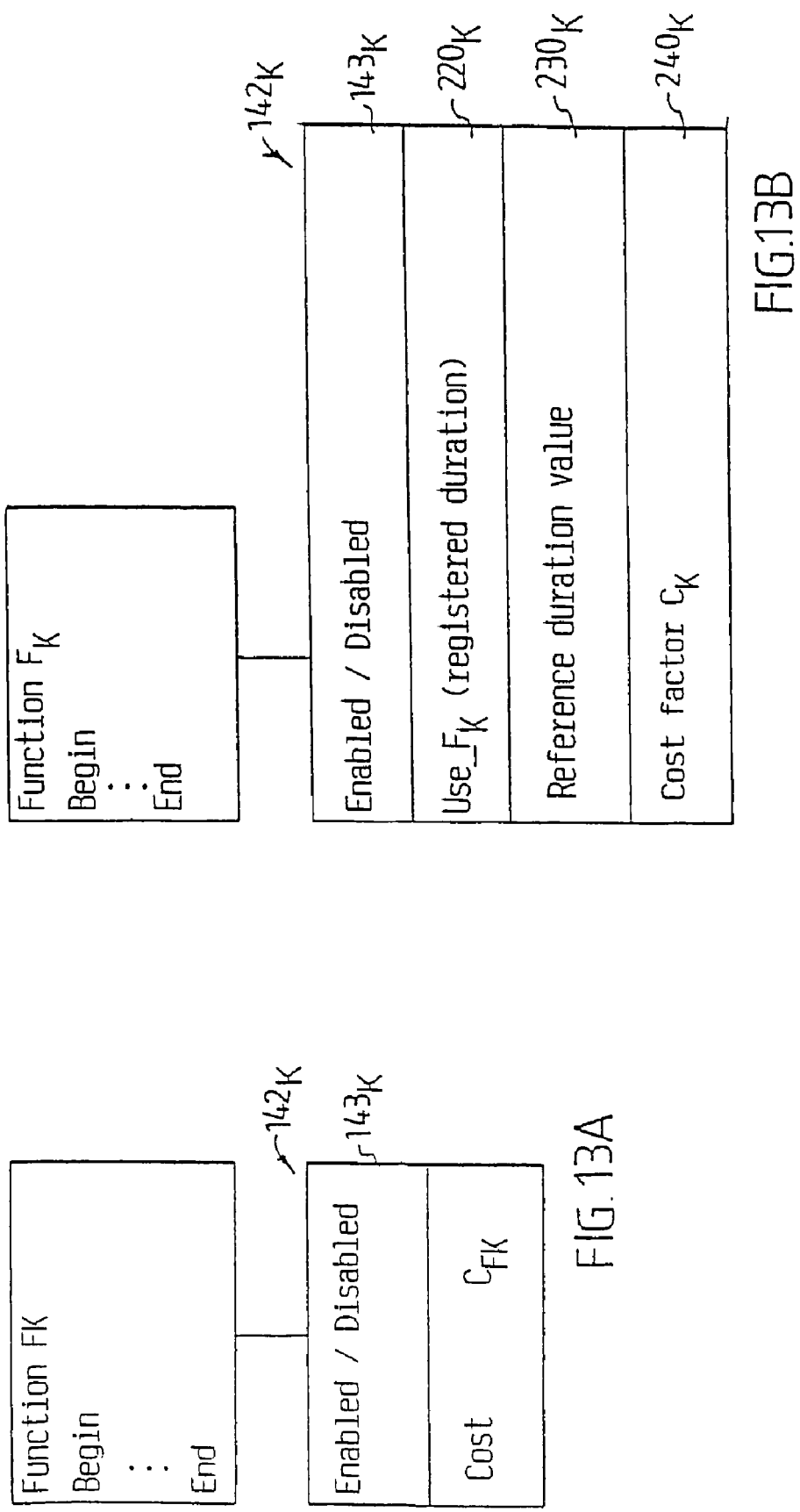

ANALYSIS SYSTEM

CROSS REFERENCES TO RELATED APPLICATIONS

This application is a division of application Ser. No. 10/501,769, filed on Jun. 27, 2005, now U.S. Pat. No. 7,313,484 application Ser. No. 10/501,769 is the national phase of PCT International Application No. PCT/SE03/00088 filed on Jan. 20, 2003 under 35 U.S.C. § 371, which claims priority of Provisional Application No. 60/384,118 filed May 31, 2002.

BACKGROUND OF THE INVENTION

1. Technical Field of the Invention

The present invention relates to an apparatus for analysing the condition of a machine, and to a system for analysing the condition of a machine. The invention also relates to method of operating such a system.

2. Description of Related Art

Machines with moving parts are subject to wear with the passage of time, which often causes the condition of the machine to deteriorate. Examples of such machines with movable parts are motors, pumps, generators, compressors, lathes and CNC-machines. The movable parts may comprise a shaft and bearings.

In order to prevent machine failure, such machines should be subject to maintenance, depending on the condition of the machine. Therefore the operating condition of such a machine is preferably evaluated from time to time. The operating condition can be determined by measuring vibrations emanating from a bearing or by measuring temperature on the casing of the machine, which temperatures are dependent on the operating condition of the bearing. Such condition checks of machines with rotating or other moving parts are of great significance for safety and also for the length of the life of such machines. It is known to manually perform such measurements on machines. This ordinarily is done by an operator with the help of a measuring instrument performing measurements at measuring points on one or several machines.

A number of commercial instruments are available, which rely on the fact that defects in rolling-element bearings generate short pulses, usually called shock pulses. State of the art shock pulse measuring apparatuses may include proprietary technology for generating a value indicative of the condition of a bearing or a machine.

WO 98/01831 discloses a machine having a measuring point and a shalt with a certain shaft diameter, wherein the shaft can rotate when the machine is in use. WO 98/01831 also discloses an apparatus for analysing the condition of a machine having a rotating shaft. The disclosed apparatus has a sensor for producing a measured value indicating the vibration or temperature at the measuring point. The apparatus disclosed in WO 98/01831 has a microprocessor and an analysis routine stored in a memory. According to WO 98/01831 the following process can be performed by running the analysis routine on the microprocessor:

producing the measured value;
acquiring interpretation information from an information carrier which is mounted by the measuring point;
producing an actual condition value, indicating the actual condition of the machine at the measuring point, dependent on the measured value and the interpretation information;
acquiring a second condition value, indicating the condition of the machine at measuring point at an earlier point of time, from the information carrier;
producing a relation value dependent on the actual condition value and the second condition value, which relation value indicates a change in the condition.

SUMMARY OF THE INVENTION

An aspect of the invention relates to the problem of achieving a cost-effective improvement of the length of life of machines having a rotating shaft.

This problem is addressed by an apparatus for analysing the condition of a machine having a rotating shaft, comprising:

at least one input for receiving measurement data from a sensor for surveying a measuring point of the machine; said measurement data being dependent on rotation of said shaft;

data processing means for processing condition data dependent on said measurement data; said data processing means comprising means for performing a plurality of condition monitoring functions; wherein at least one of said plurality of condition monitoring functions is a restricted function having a disabled state and an enabled state; said disabled state prohibiting complete execution of said condition monitoring function; and said enabled state allowing execution; wherein the apparatus is arranged to allow a limited amount of use of the at least one restricted condition monitoring function; and wherein at least one of said plurality of condition monitoring functions is an unrestricted function; the apparatus further comprising a logger for registering use of said at least one restricted condition monitoring function; wherein the apparatus is arranged to change the state of a restricted condition monitoring function from the enabled state to the disabled state when said registered use indicates that the limited amount of use has been spent; and the apparatus is arranged to allow execution of the at least one unrestricted function irrespective of amount of use of the at least one unrestricted function.

This solution is advantageously versatile, allowing a user to get a machine analysis apparatus with some functions to which the user has an unlimited access, and some functions for which the user can pay at a per use basis. This makes it possible for the user to get a machine analysis apparatus adapted according to that users need. Thereby the user does not need to pay for an expensive instrument providing unlimited access to a number of advanced functions for which that user has little or no need. The solution also allows the supplier to offer the apparatus in a large number of versions and at different price levels. Advantageously the different versions of the apparatus can be provided by means of the same hardware solution.

The supplier can control which of the functions are to be unrestricted so that the user after buying the apparatus is allowed an unlimited amount of use of selected functions, and which of the functions are to be restricted so that the user, after buying the apparatus, can use these at a pay-per-use basis.

According to an embodiment the apparatus further comprises a user interface for allowing an operator to select to request the apparatus to perform a condition monitoring function;

means for checking whether a selected condition monitoring function is a restricted function or an unrestricted function;

means for causing the apparatus to perform the selected condition monitoring function when the selected condition monitoring function is an unrestricted function.

According to an embodiment the apparatus further comprises means for causing the apparatus to check whether the selected condition monitoring function is enabled or disabled when the selected condition monitoring function is a restricted condition monitoring function; wherein said logger is adapted to register use of the selected condition monitoring function when the selected condition monitoring function is an enabled restricted condition monitoring function.

According to an embodiment the apparatus is arranged to register use of an enabled restricted condition monitoring function by changing a value of a parameter.

According to an embodiment at least one of said plurality of unrestricted condition monitoring functions has an enabled state and a disabled state.

This solution advantageously allows a client to choose which functions to have unlimited access to, and which functions to buy at a pay-per-use basis, since unrestricted as well as restricted functions can be individually enabled or disabled.

According to an embodiment said plurality of condition monitoring functions includes two or three or more functions selected from the group consisting of: vibration analysis, temperature analysis, shock pulse measuring, spectrum analysis of shock pulse measurement data, Fast Fourier Transformation of vibration measurement data, graphical presentation of condition data on a user interface, storage of condition data in a writeable information carrier on said machine, storage of condition data in a writeable information carrier in said apparatus, tachometering, imbalance detection, misalignment detection.

An aspect of the invention relates to the problem of achieving a cost-effective improvement of the length of life of machines having a rotating shaft. This problem is addressed by an apparatus for analysing the condition of a machine having a rotating shaft, comprising:

at least one input for receiving measurement data from a sensor for surveying a measuring point of the machine; said measurement data being dependent on rotation of said shaft;

data processing means for processing condition data dependent on said measurement data; said data processing means comprising means for performing a plurality of condition monitoring functions; wherein at least one of said plurality of condition monitoring functions is a restricted function having a disabled state and an enabled state; said disabled state prohibiting complete execution of said condition monitoring function; and said enabled state allowing execution; wherein the apparatus is arranged to allow a limited amount of use of the at least one restricted condition monitoring function; and wherein at least one of said plurality of condition monitoring functions is an unrestricted function; the apparatus further comprising a logger for registering use of said at least one restricted condition monitoring function; wherein the apparatus is arranged to change the state of a restricted condition monitoring function from the enabled state to the disabled state when said registered use indicates that the limited amount of use has been spent; and the apparatus is arranged to allow execution of the at least one unrestricted function irrespective of amount of use of the at least one unrestricted function.

This solution is advantageously versatile, allowing a user to get a machine analysis apparatus with some functions to which the user has an unlimited access, and some functions for which the user can pay at a per use basis. This makes it possible for the user to get a machine analysis apparatus adapted according to the need of that individual user. Thereby the user does not need to pay for an expensive instrument providing unlimited access to a number of advanced functions for which that user has little or no need. The solution also allows the supplier to offer the apparatus in a large number of versions and at different price levels. Advantageously the different versions of the apparatus can be provided by means of the same hardware solution. The supplier can control which of the functions are to be unrestricted so that the user after buying the apparatus is allowed an unlimited amount of use of selected functions, and which of the functions are to be restricted so that the user, after buying the apparatus, can use these at a pay-per-use basis.

According to an embodiment the apparatus further comprises a user interface for allowing an operator to select to request the apparatus to perform a condition monitoring function;

means for checking whether a selected condition monitoring function is a restricted function or an unrestricted function;

means for causing the apparatus to perform the selected condition monitoring function when the selected condition monitoring function is an unrestricted function.

According to an embodiment the apparatus further comprises means for causing the apparatus to check whether the selected condition monitoring function is enabled or disabled when the selected condition monitoring function is a restricted condition monitoring function; wherein said logger is adapted to register use of the selected condition monitoring function when the selected condition monitoring function is an enabled restricted condition monitoring function.

According to an embodiment the apparatus is arranged to register use of an enabled restricted condition monitoring function by changing a value of a parameter.

According to an embodiment a first parameter is associated with a first restricted condition monitoring function; said first parameter being indicative of a remaining amount of allowed use for the first restricted condition monitoring function; and a second parameter is associated with a second restricted condition monitoring function; said second parameter being indicative of a remaining amount of allowed use for the second restricted condition monitoring function.

According to an embodiment at least one of said plurality of unrestricted condition monitoring functions has an enabled state and a disabled state.

This solution advantageously allows a client to choose which functions to have unlimited access to, and which functions to buy at a pay-per-use basis, since unrestricted as well as restricted functions can be individually enabled or disabled.

An aspect of the invention relates to the problem of providing equipment for analysing the condition of a machine satisfying the conflicting requirements of reducing the price for a piece of condition monitoring equipment while maintaining profitability for the supplier of the analysis system.

This problem is addressed by an apparatus for analysing the condition of a machine, comprising an apparatus for analysing the condition of a machine, comprising:

at least one input for receiving measurement data from a sensor for surveying a measuring point of the machine;

data processing means for processing condition data dependent on said measurement data; said data processing means comprising means for performing a plurality of condition monitoring functions; and a logger for registering use of at least one of said condition monitoring functions.

This advantageously enables charging a cost for use of the apparatus.

An embodiment of the apparatus comprising:

a communication port; wherein said apparatus is adapted to be capable of delivering data indicative of said registered use on said communication port.

This advantageously enables delivery of use info to a supplier, for charging a cost. i.e. reporting the amount of use to the supplier.

An embodiment of the apparatus further comprises:

means for comparing said registered use with a first reference value, means for disabling said data processing means or at least one of said condition monitoring functions in response to the outcome of said comparison.

This solution encourages a user to buy additional usage so as to maintain operability of desired functions of the analysis apparatus. Such additional usage may be in the form of a number of measurements using a desired function, or a period of time the duration of which is defined by the registered use and the first reference value.

An embodiment of the apparatus further comprises: key reception means adapted to allow further use of said data processing means in response to reception of a first key.

This advantageously enables a supplier to amend the relation between a registered use value and the reference value. Thereby it is possible to increase "the stored amount of use" available before the data processing means is disabled.

An embodiment of the apparatus further comprises:

key reception means adapted to allow further use of a selected one of said condition monitoring functions in response to reception of a key associated with said selected function.

This advantageously enables a supplier to amend the relation between the reference value and a registered use value for a selected function. Thereby it is possible to increase "the stored amount of use" available before the selected function is disabled.

An embodiment of the apparatus further comprises:

means for reading a current value of said registered use;

means for comparing said current value with a second reference value;

means for registering use at a first rate when said current value is above the second reference value; and means for registering use at a second rate when said current value is below the second reference value.

This advantageously enables a supplier to sell usage at different costs. When, according to one embodiment, a user has paid for a certain amount $A_p$ of usage, the second reference value is a level indicating that the whole amount $A_p$ of usage has been spent. This means that any further use will be usage which has not yet been paid for. By the feature of registering such further use at a second rate it is possible to charge a higher cost per unit of usage for such further use.

An embodiment of the apparatus wherein:

at least some of said plurality of condition monitoring functions is at least partly embodied by computer program code.

An aspect of the invention relates to the problem of achieving a cost-effective improvement of the length of life of machines with a moving part.

An aspect of the invention relates to the problem of achieving an analysis apparatus for evaluating the condition of a machine, This problem is addressed by An apparatus for monitoring the condition of a machine, comprising:

at least one input for receiving measurement data from a sensor for surveying a measuring point of the machine;

data processing means for processing condition data dependent on said measurement data; said data processing means comprising means for performing at least two condition monitoring functions;

at least one of said plurality of condition monitoring functions having a locked state and an unlocked state; said locked state prohibiting complete execution of said condition monitoring function; and said unlocked state allowing execution;

means for changing the state of a selected condition monitoring function between the locked state and the unlocked state.

This advantageously provides the analysis apparatus with an improved versatility. A manufacturer can manufacture the apparatus in a single fashion, and a supplier can sell the apparatus in several versions. More precisely, an apparatus having two individually lockable/unlockable functions can be provided in the following versions:

with only the first function unlocked;

with only the second function unlocked;

with the first function and the second function unlocked.

Hence, a supplier can offer the apparatus in three versions, and this allows for selling it at different price levels dependent on the functionality included. Each client is therefore provided with a choice as to which functions to choose.

An embodiment of the apparatus further comprises:

key reception means adapted to allow use of a selected one of said condition monitoring functions in response to reception of a key associated with said selected function;

a logger for registering use of at least one of said condition monitoring functions.

means for comparing said registered use with a first reference value, means for disabling said data processing means or at least one of said condition monitoring functions in response to the outcome of said comparison.

Hence, A manufacturer can manufacture the apparatus in a single fashion, and a supplier can sell the apparatus in more than four versions:

with only the first function unlocked;

with only the second function unlocked;

with the first function and the second function unlocked.

with both functions locked but each function individually or collectively unlockable for a limited amount of use.

BRIEF DESCRIPTION OF THE DRAWINGS

For simple understanding of the present invention, it will be described by means of examples and with reference to the accompanying drawings, of which:

FIG. 1 shows a schematic block diagram of an embodiment of a condition analyzing system according to an embodiment of the invention.

FIG. 2 is a schematic block diagram of an embodiment of a part of the condition analyzing system 2 shown in FIG. 1.

FIGS. 5A and 5B show a flow chart illustrating an embodiment of a procedure according to the invention.

FIG. 5C is a simplified illustration of a principle of an embodiment of an account value or amount of usage parameter.

FIG. 5D is an illustration of a principle of an embodiment wherein the cost per use changes after a certain level of use has been attained.

FIG. 13A illustrates a part of memory 60 comprising a function $F_k$ and an associated status field 142.

FIG. 13B illustrates a part of memory 60 according to an embodiment, comprising a function $F_k$ and an associated status field $142_k$.

DETAILED DESCRIPTION OF EMBODIMENTS

Figure 3:
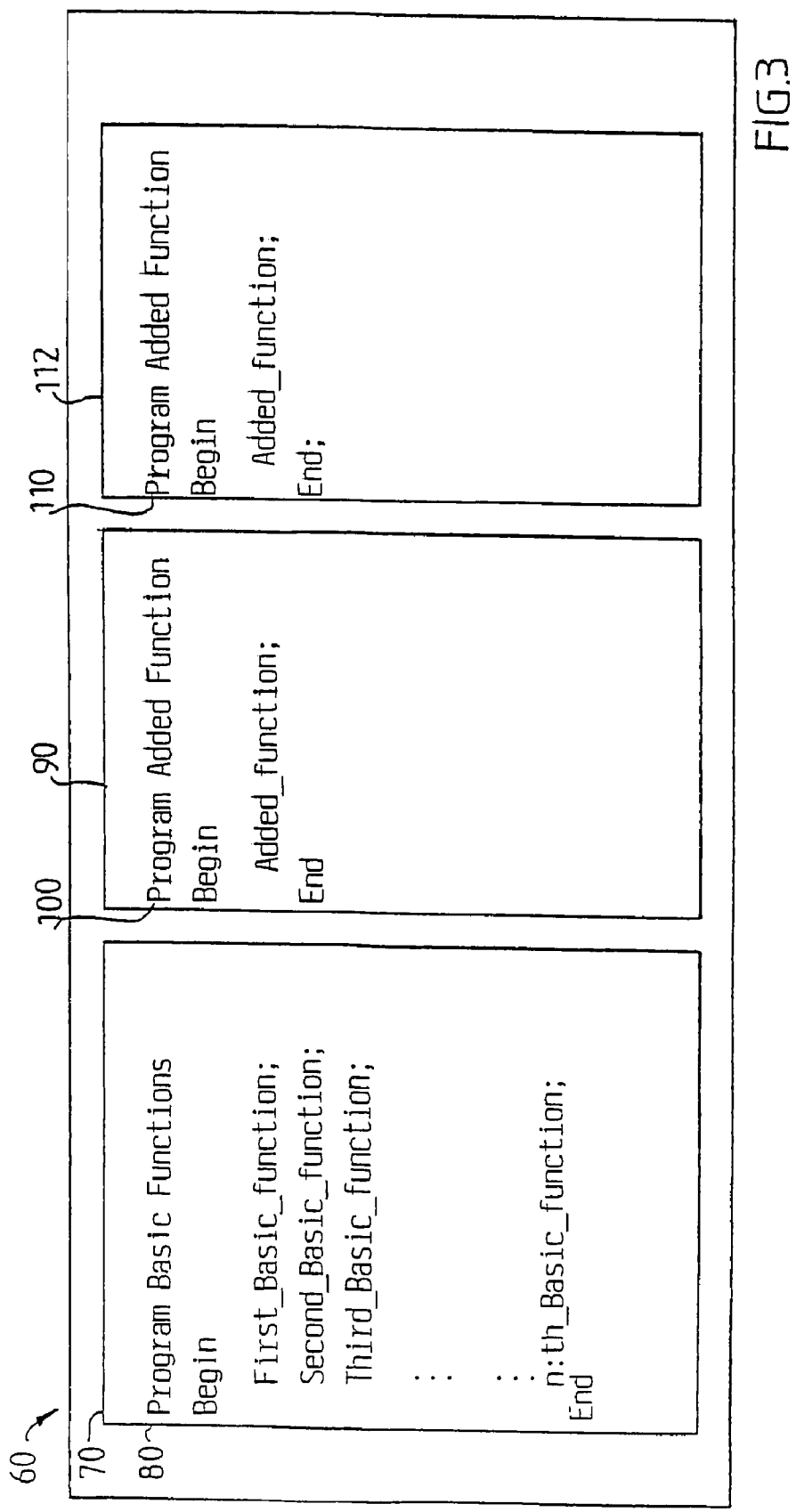
FIG. 3 is a simplified illustration of an embodiment of a memory and its contents.

In the following description similar features in different embodiments may be indicated by the same reference numerals.

FIG. 1 shows a schematic block diagram of an embodiment of a condition analyzing system 2 according to an embodiment of the invention. Reference numeral 4 relates to a client location with a machine 6 having a movable part 8. The movable part may comprise bearings 7 and a shaft 8 which, when the machine is in operation, rotates. The operating condition of the shaft 8 or of a bearing 7 can be determined in response to vibrations emanating from the shaft and/or bearing when the shaft rotates. Additionally the operating condition of a bearing 7 can be determined in response to temperature measured on the casing of the machine. The client location 4, which may also be referred to as client part or user part, may for example be the premises of a paper mill plant, or some other manufacturing plant having machines with movable parts.

An embodiment of the condition analyzing system 2 is operative when a sensor 10 is firmly attached on or at a measuring point 12 on the body of the machine 6.

Although FIG. 1 only illustrates two measuring points 12, it to be understood that a location 4 may comprise any number of measuring points 12. The condition analysis system 2 shown in FIG. 1, comprises an analysis apparatus 14 for analysing the condition of a machine on the basis of measurement values delivered by the sensor 10.

The analysis apparatus 14 has a communication port 16 for bi-directional data exchange. The communication port 16 is connectable to a communications network 18, e.g. via a data interface 19. The communications network 18 may be the world wide internet, also known as the Internet. The communications network 18 may also comprise a public switched telephone network.

A server computer 20 is connected to the communications network 18. The server 20 may comprise a database 22, user input/output interfaces 24 and data processing hardware 26, and a communications port 29. The server computer 20 is located on a location 28, which is geographically separate from the client location 4. The server location 28 may be in a first city, such as the Swedish capital Stockholm, and the client location may be in another city, such as Stuttgart, Germany or Detroit in Michigan, USA. Alternatively, the server location 28 may be in a first part of a town and the client location may be in another part of the same town. The server location 28 may also be referred to as supplier part 28, or supplier part location 28. A supplier company who may sell and deliver analysis apparatuses 14 occupies the supplier part location 28. The supplier company may also distribute use allowance to analysis apparatuses 14 having use restricted condition monitoring functions, as discussed in further detail elsewhere in this document.

According to one embodiment of the system 2 the apparatus 14 is a portable apparatus which may be connected to the communications network 18 from time to time.

According to another embodiment of the system 2 the apparatus 14 is connected to the communications network 18 substantially continuously. Hence, the system 2 according to this embodiment may substantially always be "on line" available for communication with the supplier computer 20.

FIG. 2 is a schematic block diagram of an embodiment of a part of the condition analyzing system 2 shown in FIG. 1. The condition analyzing system, as illustrated in FIG. 2, comprises a sensor unit 10 for producing a measured value. The measured value may be dependent on movement or, more precisely, dependent on vibrations. Alternatively the measured value may be dependent on temperature.

An embodiment of the condition analyzing system 2 is operative when a device 30 is firmly mounted on or at a measuring point on a machine 6. The device 30 mounted at the measuring point may be referred to as a stud 30. A stud 30 can comprise a connection coupling 32 to which the sensor unit 10 is removably attachable. The connection coupling 32 can, for example comprise double start threads for enabling the sensor unit to be mechanically engaged with the stud by means of a ¼ turn rotation.

A measuring point 12 can comprise a threaded recess in the casing of the machine. A stud 30 may have a protruding part with threads corresponding to those of the recess for enabling the stud to be firmly attached to the measuring point by introduction into the recess like a bolt.

Alternatively, a measuring point can comprise a threaded recess in the casing of the machine, and the sensor unit 10 may comprise corresponding threads so that it can be directly introduced into the recess. Alternatively, the measuring point is marked on the casing of the machine only with a painted mark.

The machine 6 exemplified in FIG. 2 may have a rotating shaft with a certain shaft diameter d1. The shaft in the machine 24 may rotate at a certain speed of rotation V1 when the machine 6 is in use.

The sensor unit 10 may be coupled to the apparatus 14 for analysing the condition of a machine. The analysis apparatus 14 comprises a sensor interface 40 for receiving a measured signal or measurement data, produced by the sensor 10. The sensor interface 40 is coupled to a data processing means 50 capable of controlling the operation of the analysis apparatus 14 in accordance with program code. The data processing means 50 is also coupled to a memory 60 for storing said program code.

According to an embodiment of the invention the sensor interface 40 comprises an input 42 for receiving an analog signal, the input 42 being connected to an analogue-to-digital (A/D) converter 44, the digital output of which is coupled to the to the data processing means 50.

The program memory 60 is preferably a non-volatile memory. The memory 60 may be a read/write memory, i.e. enabling both reading data from the memory and writing new data onto the memory 60. According to an embodiment the program memory 60 is embodied by a FLASH memory. The program memory 60 may comprise a first memory segment 70 for storing a first set of program code 80 which is executable so as to control the analysis apparatus 14 to perform basic operations (FIG. 2 and FIG. 3). The program memory may also comprise a second memory segment 90 for storing a second set of program code 100.

According to some embodiments of the invention the second set of program code is initially disabled so as to prohibit execution of said second set of program code. The disabled data 100 may be enabled in response to reception of a key.

According to an embodiment of the invention the apparatus 14 comprises an interface means for receiving the key.

The data processing means 50 is also coupled to a read/write memory 52 for data storage. Moreover, the data processing means 50 may be coupled to an analysis apparatus communications interface 54. The analysis apparatus communications interface 54 provides for bi-directional communication with a measuring point communication interface 56 which is attachable on, at or in the vicinity of the measuring point on the machine.

The measuring point 12 comprises a connection coupling 32, a readable and writeable information carrier 58, and a measuring point communication interface 56.

The writeable information carrier 58, and the measuring point communication interface 56 may be provided in a separate device 59 placed in the vicinity of the stud 30, as illustrated in FIG. 2. Alternatively the writeable information carrier 58, and the measuring point communication interface 56 may be provided within the stud 30. This is described in more detail in WO 98/01831, the content of which is hereby incorporated by reference.

The sensor unit 10 comprises a vibration transducer, the sensor unit being structured to physically engage the connection coupling of the measuring point so that vibrations of the machine at the measuring point are transferred to the vibration transducer.

The analysis apparatus 14 comprises an analog-to-digital converter 44 electrically connected to receive an output delivered by the sensor unit 10, a microprocessor 50 electrically connected to receive an output of the analog-to-digital converter, and an analysis apparatus communication interface 54 connected to the microprocessor.

The system 2 is arranged to allow bidirectional communication between the measuring point communication interface 56 and the analysis apparatus communication interface 54. The measuring point communication interface 56 and the analysis apparatus communication interface 54 are preferably constructed to allow wireless communication. According to an embodiment the measuring point communication interface and the analysis apparatus communication interface are constructed to communicate with one another by radio frequency (RF) signals. This embodiment includes an antenna in the measuring point communication interface 56 and another antenna the analysis apparatus communication interface 54.

Embodiments of the measuring point 12 and the communications interfaces 54/56 are described in more detail in WO 98/01831, the content of which is hereby incorporated by reference.

FIG. 3 is a simplified illustration of an embodiment of the memory 60 and its contents. The simplified illustration is intended to convey understanding of the general idea of storing different program functions in memory 60, and it is not necessarily a correct technical teaching of the way in which a program would be stored in a real memory circuit. The first memory segment 70 stores program code for controlling the analysis apparatus 14 to perform basic operations. Although the simplified illustration of FIG. 3 shows pseudo code, it is to be understood that the program code 80 may be constituted by machine code, or any level program code that can be executed or interpreted by the data processing means 50 (FIG. 2).

The second memory segment 90, illustrated in FIG. 3, stores a second set of program code 100. The program code in segment 90, when run on the data processing means 50, will cause the analysis apparatus 14 to perform an added function. The added function may comprise an advanced mathematical processing of a measured signal received via the sensor interface 40. The added function, however, will be enabled and available only if the corresponding key or keyword has been entered.

A Keyword Embodiment

Figure 7:
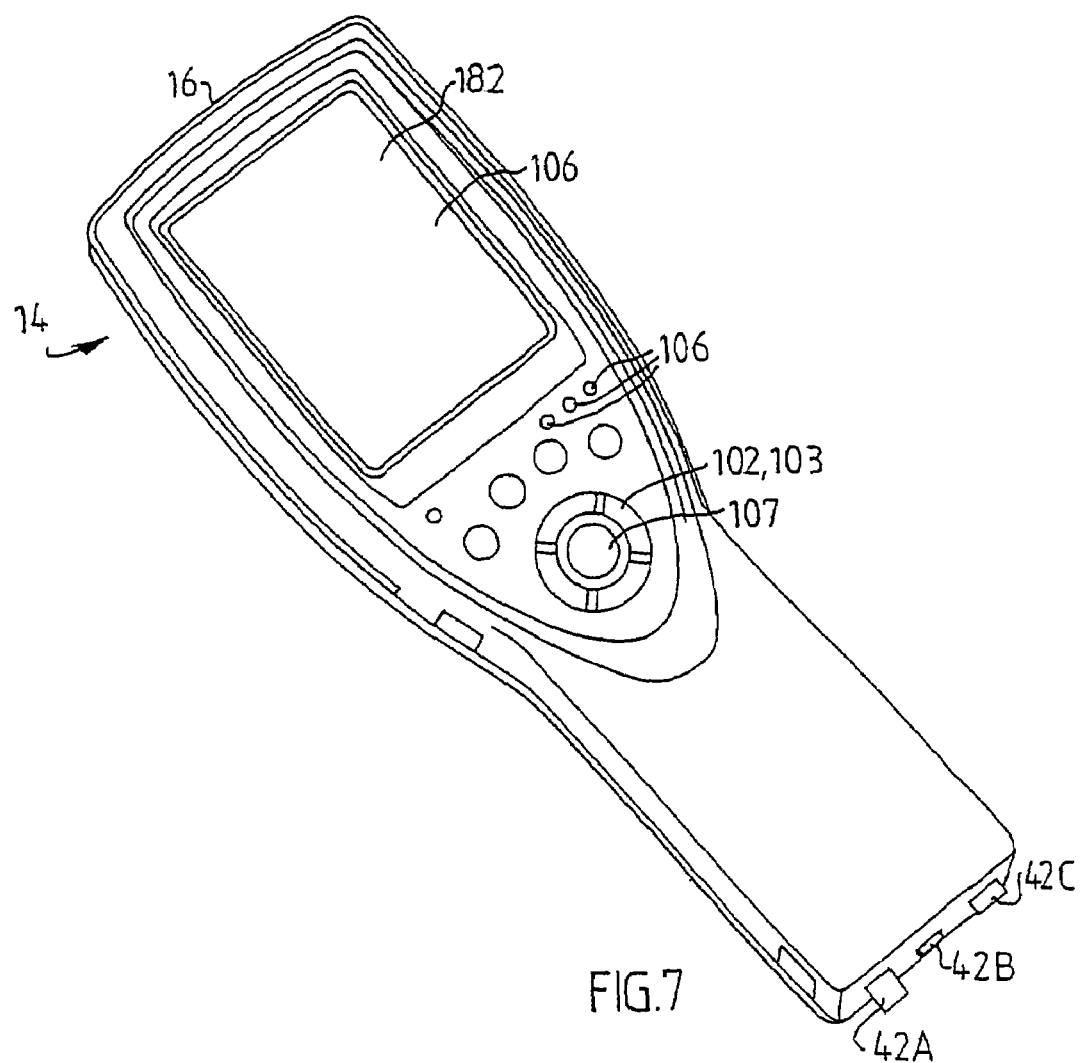
FIG. 7 is a physical embodiment of an apparatus.
Figure 9:
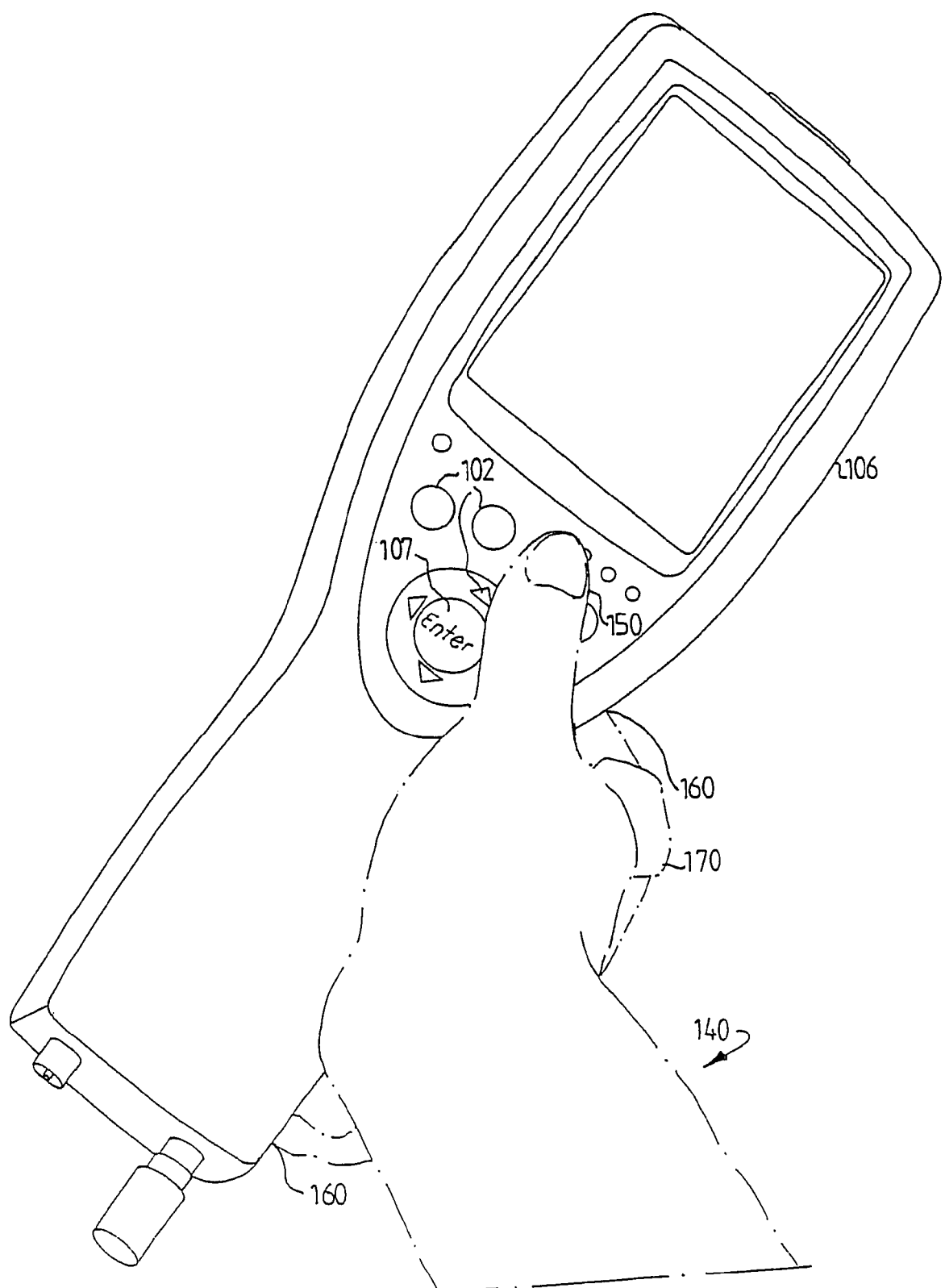
FIG. 9 illustrates the apparatus, shown in FIG. 7, being gripped by a hand 140 of a user.

According to an embodiment of the analysis apparatus 14 (FIG. 2), the interface means comprises a user input interface 102, whereby an operator may introduce the key in the form of a code word, also referred to as keyword. According to this embodiment the first set of program code 80 in the apparatus 14 comprises a program routine for requesting a code word, and for determining whether a received code word is accepted. According to an embodiment the user input interface 102 comprises a set of buttons 104. An embodiment of the analysis apparatus 14 comprises a user output interface 106. The user output interface may comprise a display unit 106. The data processing means 50, when it runs a basic program function provided in the basic program code 80, provides for user interaction by means of the user input interface 102 and the display unit 106. The set of buttons 104 may be limited to a few buttons, such as for example five buttons, as illustrated in FIG. 2, or nine buttons as illustrated in FIGS. 7 and 9. A central button 107 may be used for an ENTER or SELECT function, whereas other, more peripheral buttons may be used for moving a cursor on the display 106. In this manner it is to be understood that symbols and text, such as the above mentioned code word, may be entered into the apparatus 14 via the user interface. The display unit 106 may, for example, display a number of symbols, such as the letters of alphabet, while the cursor is movable on the display in response to user input so as to allow the user to input a code word and/or other information. Hence, a key for enabling a disabled condition monitoring function, and/or for adding an amount of usage allowance to a use restricted condition monitoring function may be entered via the user interface 102, 106 in an advantageously user friendly manner.

The enabled, executable version 110 of the second set of program code 100 may comprise an analysis routine for processing measured signals or measurement data received on the input 40 from the sensor 10.

According to an embodiment of the invention the second set of program code 100 is disabled by means of encryption. Hence, according to this embodiment the second set of program code 100 is an encrypted set of data 100. The encrypted data 100 is decryptable. Decryption may be achieved by means of a decryption program routine, provided that a correct decryption key, e.g. in the form of a data word, is received. The decryption routine may be comprised in one of the basic functions 80, illustrated in FIG. 3.

In the course of decrypting an encrypted set of data 100, the decrypted data 110 may be stored at a third memory location 112. When decrypted, the second set of program code is an executable version 110 of the second set of program code 100. Hence, the memory location 90 may store a disabled version of computer program code and, provided a correct key has been entered, the memory location 112 will provide access to an enabled version of that computer program code.

Although, in the above, enabling of program functions has been described in detail only for a single program function, it to be understood that a large number of analysis functions may be provided in a disabled state in the analysis apparatus 14.

The number of disabled program functions stored by the apparatus 14 may be in the range from one to twenty-five, or even more. This advantageously leads to a wide selection of functions, and the apparatus 14 may be sold at a competitive and relatively low price in a version where only one or a few of the program functions are enabled. According to a preferred embodiment an enabled program function remains enabled for a limited amount of use such that when the limited amount of use has been consumed, the program function will automatically become disabled again. An additional amount of use of the program function can be added by means of a dedicated usage enabling procedure. Execution of the dedicated usage enabling procedure may require clearance by the distributor. This embodiment of the invention advantageously makes it possible to provide, on the market at a competitively low price, a condition analysis system comprising a wide variety of program functions so that users may obtain a very versatile instrument at low initial cost. The user may instead pay a certain amount of money for obtaining an additional amount of use of a selected program function.

According to an embodiment of the invention the apparatus 14 stores at least five different disabled program functions, when the apparatus is ready to be delivered to a customer. According to another embodiment the apparatus 14 stores at least fifteen different disabled program functions upon delivery to a customer. According to some embodiments at least two of the initially disabled program functions are, when enabled, for generating indications of the condition of a machine in response to measured vibrations. According to preferred embodiments at least half of the initially disabled program functions are, when enabled, for generating indications of the condition of a machine in response to measured vibrations.

Each one of the disabled functions can be individually enabled in dependence of a key. According to some embodiments of the invention each function is individually enabled dependent on a unique key word. According to an embodiment a group of program functions can be enabled in dependence of one single keyword.

A Mechanical Key Embodiment

According to another embodiment the interface means in the apparatus 14 comprises a receptor for receiving a mechanical key (not shown). According to this embodiment an operator may introduce the key in the form of a mechanical key for the purpose of enabling an additional analysis apparatus function. The receptor for receiving a key may comprise contact means operating to enable the disabled data 100 on reception of the corresponding correct key. According to one version of this embodiment the correct mechanical key may be rotated to cause a contact device to close an electric contact coupled to the memory 60, thereby enabling the reading of a range of memory addresses. Following such a procedure, the data processing means 50 is capable of reading and executing the second set of program code 100 which is stored on said second memory segment 90, i.e. on said range of memory addresses.

A Procedure and a System Providing Tailored Functionality for Evaluating the Condition of a Machine Analysis of a machine's vibration signature is valuable for reducing unscheduled down time, reducing downtime for repair, minimizing periodic disassembly of a machine for inspection and greatly reducing the probability of catastrophic and unexpected machine failure.

According to one embodiment of the invention, a manufacturer of condition monitoring systems may provide customers with a very versatile, yet non-expensive analysis apparatus 14. The analysis apparatus 14 according to this embodiment allows for "tailored" outfit of Machine Condition Monitoring functions (MCM functions), in accordance with the individual preference of each customer. Potential customers of condition monitoring apparatus range from maintenance personnel—spending all their professional time analysing the condition of machines with the use of advanced analysis functions—to workshop personnel with a need to make an occasional control of a few machines.

The workshop personnel usually require only a few basic monitoring functions for detection of whether the condition of a machine is normal or abnormal. On detecting an abnormal condition, the workshop personnel may call for professional maintenance personnel to establish the exact nature of the problem, and for performing the necessary maintenance work. The professional maintenance personnel frequently needs and uses a broad range of evaluation functions making it possible to establish the nature of, and/or cause for, an abnormal machine condition. Hence, different users of an analysis apparatus 14 may pose very different demands on the function of the apparatus.

In order to satisfy this broad range of demands, an embodiment of the present condition analysis system advantageously includes an apparatus 14 having a plurality of disabled Machine Condition Monitoring functions, each one of which may be enabled and activated on demand. Such an apparatus 14 for monitoring the condition of a machine can comprise:

at least one input 42 for receiving measurement data from a sensor 10 for surveying a measuring point 12 of the machine; and data processing means 50 for processing condition data dependent on said measurement data; said data processing means comprising means for performing at least two condition monitoring functions F1, F2. At least one of said plurality of condition monitoring functions F1, F2 has a locked state and an unlocked state; said locked state prohibiting complete execution of said condition monitoring function; and said unlocked state allowing execution of said condition monitoring function. The apparatus 14 also comprises means 141 (FIG. 4) for changing the state of a selected condition monitoring function F1, F2 between the locked state and the unlocked state.

This solution advantageously provides the analysis apparatus with an improved versatility. A manufacturer can manufacture the apparatus in a single fashion, and a supplier can sell the apparatus in several versions. More precisely, an apparatus having two individually lockable/unlockable functions can be provided in the following versions:

with only the first function F1 unlocked;

with only the second function F2 unlocked;

with the first function F1 and the second function F2 unlocked.

Hence, a supplier can offer the apparatus in three versions, and this allows for selling it at different price levels dependent on the functionality included. Each client is therefore provided with a choice as to which functions to choose.

The data processing means may comprise a large number of locked or disabled functions F1, F2, F3 . . . Fn, where n is a positive integer. Each one of the functions F1, F2, F3 . . . Fn may be individually enabled/unlocked or disabled/locked.

Figure 4:
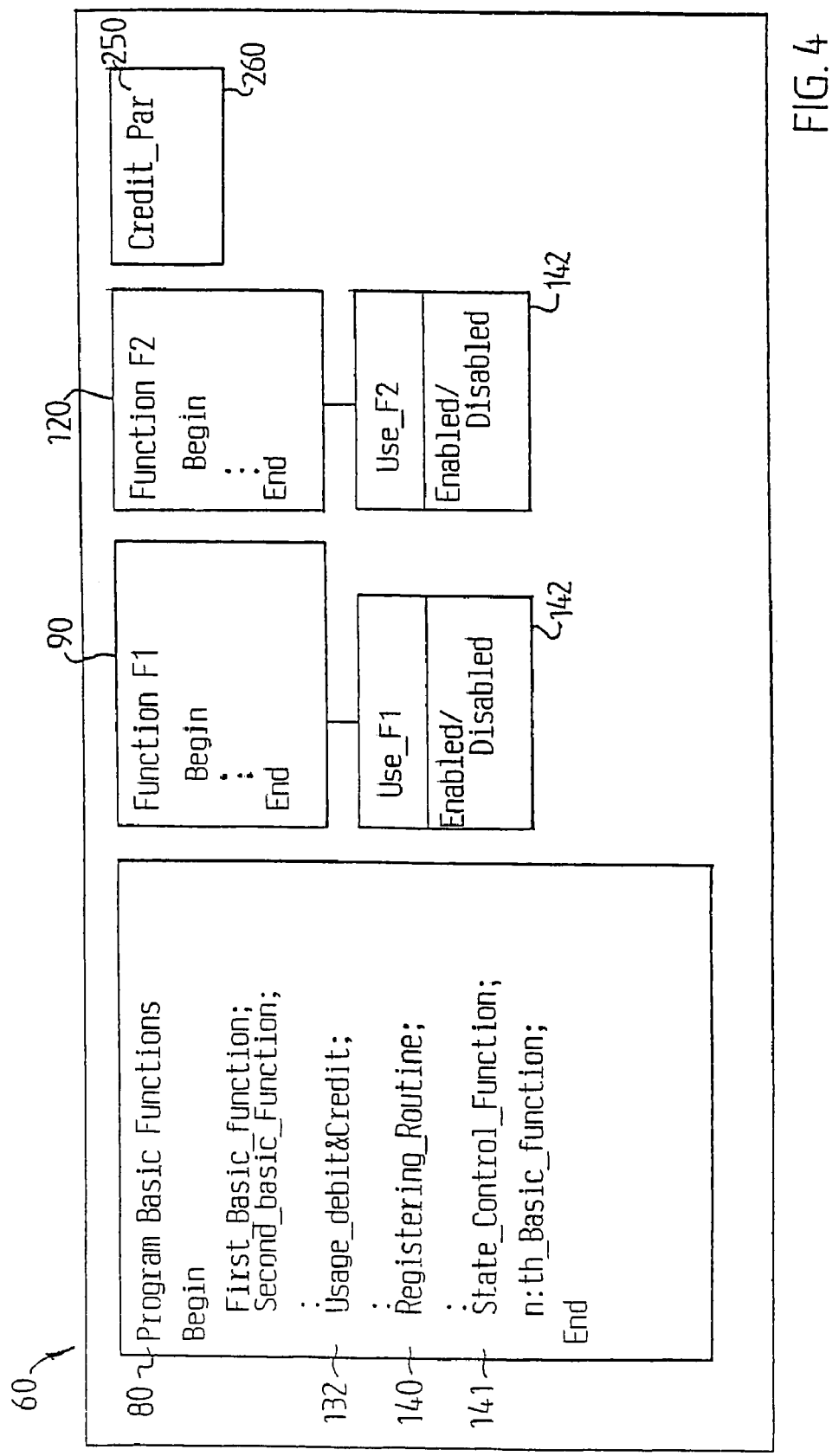
FIG. 4 is a simplified illustration of a second embodiment of the memory and its contents.

FIG. 4 is a simplified illustration of a second embodiment of the memory 60 and its contents. As described above, the first memory segment 70 stores program code for controlling the analysis apparatus 14 to perform basic operations.

The second memory segment 90, illustrated in FIG. 4, stores a second set of program code 100. The program code in segment 90, when run on the data processing means 50, will cause the analysis apparatus 14 to perform a first Machine Condition Monitoring function (MCM function) F1.

The memory 60 may also include a third memory segment 120, as illustrated in FIG. 4, storing a third set of program code 130. The program code in segment 120, when run on the data processing means 50, will cause the analysis apparatus 14 to perform a second Machine Condition Monitoring function F2.

The memory 60 may comprise a large number of functions F1, F2, F3 ... Fn, where n is a positive integer. Each one of the functions F1, F2, F3 ... Fn may be individually enabled/unlocked or disabled/locked as described elsewhere in this document.

Once a function F1, F2, F3 ... Fn has been enabled it may be individually activated on demand, e.g. by an operator, so that the program function causes the analysis apparatus to perform the tasks prescribed by the computer program function. The functions F1 and F2 have been described in FIG. 4 as being stored on separate memory locations, for the purpose of simplifying the understanding of this embodiment of the invention. It is, however, to be understood that the functions F1, F2, F3 ... Fn may be stored in other manners.

Additionally, one function Fi, where i is a integer in the range 1 ... n, may use some, or all, of the program code for another function Fj, where j is an integer in the range 1 ... n. This means that one function Fi may use another function Fj as a sort of subroutine.

Examples of Machine Condition Monitoring Functions

The condition monitoring functions F1, F2 ... Fn includes functions such as: vibration analysis, temperature analysis, shock pulse measuring, spectrum analysis of shock pulse measurement data, Fast Fourier Transformation of vibration measurement data, graphical presentation of condition data on a user interface, storage of condition data in a writeable information carrier on said machine, storage of condition data in a writeable information carrier in said apparatus, tachometering, imbalance detection, and misalignment detection.

According to an embodiment the apparatus 14 includes the following functions:

F1=vibration analysis;
F2=temperature analysis,
F3=shock pulse measuring,
F4=spectrum analysis of shock pulse measurement data,
F5=Fast Fourier Transformation of vibration measurement data,
F6=graphical presentation of condition data on a user interface,
F7=storage of condition data in a writeable information carrier on said machine,
F8=storage of condition data in a writeable information carrier 52 in said apparatus,
F9=tachometering,
F10=imbalance detection, and
F11=misalignment detection.
F12=Retrieval of condition data from a writeable information carrier 58 on said machine.
F13=Performing vibration analysis function F1 and performing function F12 "Retrieval of condition data from a writeable information carrier 58 on said machine" so as to enable a comparison or trending based on current vibration measurement data and historical vibration measurement data.
F14=Performing temperature analysis F2; and performing function "Retrieval of condition data from a writeable information carrier 58 on said machine" so as to enable a comparison or trending based on current temperature measurement data and historical temperature measurement data.
F15=Retrieval of identification data from a writeable information carrier 58 on said machine.

Embodiments of the function F7 "storage of condition data in a writeable information carrier on said machine", and F13 vibration analysis and retrieval of condition data is described in more detail in WO 98/01831, the content of which is hereby incorporated by reference.

The vibration analysis function F1 and shock pulse measuring F3 for the evaluation of the condition of a machine may comprise the step of obtaining a condition value by performing a measurement at the measuring point, such that the condition value is dependent on the actual condition of the machine. According to embodiments, the routines F1 and F3 may comprise the step of the microprocessor 50 requesting measured values from the sensor unit 10 (FIG. 2). According to one embodiment of the invention the sensor unit comprises a transducer having a piezo-electric element. When the measuring point 12 vibrates, the sensor unit 10, or at least a part of it, also vibrates and the transducer then produces an electrical signal of which the frequency and amplitude depend on the mechanical vibration frequency and the vibration amplitude of the measuring point 12, respectively. The electrical signal is delivered to the analog-to-digital converter 44, which with a certain sampling frequency fs converts the analog signal to consecutive digital words in a known way. The microcomputer 50 stores a series of digital words, which correspond to a time sequence of the electrical signal in the memory 60, and then performs an analysis of the signal sequence, whereby the frequency and amplitude of the signal may be determined. Consequently, a measured value for the vibration amplitude Av and the vibration frequency fv may be determined.

According to an embodiment of the above mentioned function F7 "storage of condition data in a writeable information carrier on said machine", one or both of the values vibration amplitude Av and/or vibration frequency fv are delivered to the communications interface 54 (FIG. 2). The microcomputer 50, delivers data to the communications interface 54 for the purpose of transmitting such data to the readable and writeable information carrier 58. This may be achieved by means of the communications interfaces 54 and 56, as described above in connection with FIG. 2.

The above mentioned function F12 "Retrieval of condition data from a writeable information carrier 58 on said machine" comprises: acquiring a value indicating the condition of the machine at an earlier point of time from an information carrier 58 which is placed on, at or in the vicinity of the measuring point 12.

The above mentioned function F13 includes a combination of the above described functions F1 and F12. Hence function F13 includes "Performing vibration analysis" and performing "Retrieval of condition data from a writeable information carrier 58 on said machine" so as to enable a comparison or trending based on current vibration measurement data and historical vibration measurement data. An embodiment of function F13 comprises the steps of:

producing an actual condition value, said value being dependent on the actual condition at the measuring point, and acquiring a stored value, indicating the condition of the machine at an earlier point of time from an information carrier 58 which is placed on the machine 6.

The function F13 may also include presentation of the actual condition value and the stored value on the display 106 for indication of changes. Also, a plurality of stored condition values may be acquired, wherein each condition value is associated with a time and/or date so that trends may be presented on the display.

When the apparatus 14 executes the function F15 "Retrieval of identification data from a writeable information carrier 58 on said machine" it obtains information indicative of the current machine and the current measuring point. Such identification data may be used for storage and retrieval of data in a data base in the memory 52. Such a data base may include stored condition values wherein each condition value is associated with a time and/or date. The retrieved identification data may be used for fetching the relevant previously stored data relating to the current measuring point.

An embodiment of the function F15 "Retrieval of identification data from a writeable information carrier 58 on said machine" may include the data processor 50 retrieving interpretation information relating to the measuring point. The interpretation information may include technical type values such as a diameter value d1 and a rotational speed value V1 relating to a rotating shaft in the machine.

An embodiment of the function F12 "Retrieval of condition data from a writeable information carrier 58 on said machine" also includes retrieving interpretation information relating to the measuring point. With knowledge of the interpretation information d1 and V1, respectively, a measured vibration can be converted to an actual condition value Ka. A predetermined interpretation algorithm is stored in the memory 60, and starting from an amplitude value Av and interpretation information, such as d1 and V1, the microcomputer produces a corresponding condition value Ka dependent thereon. Such an interpretation algorithm is based on an embodiment of a method for producing a condition value described in the Swedish Laid-Open Document 339 576.

According to one embodiment, the interpretation algorithm is based on the machine classification standard ISO 2954.

According to preferred embodiments the apparatus 14 does not have any function for establishing whether steam leaks or not from a steam trap.

Figure 12:
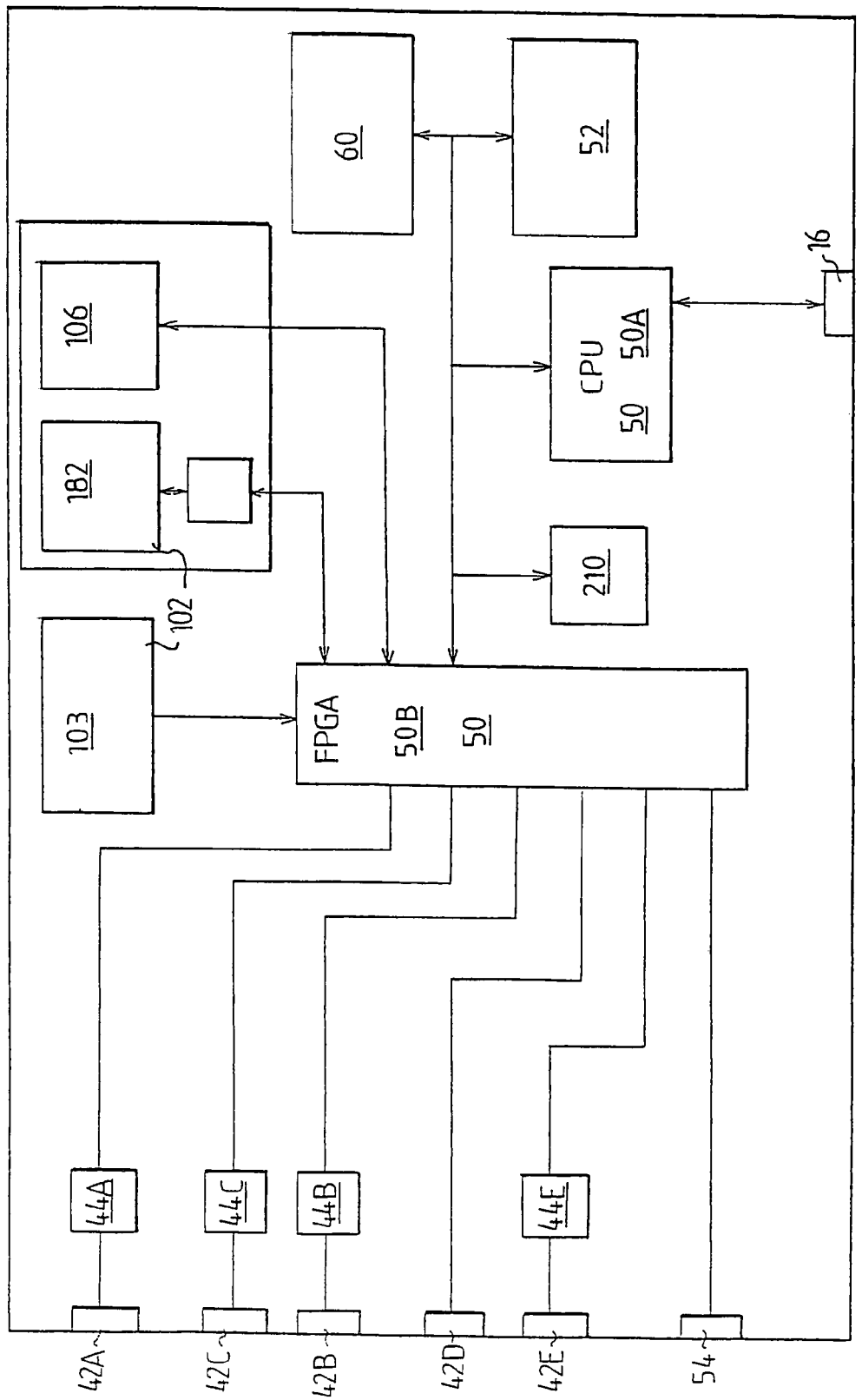
FIG. 12 is a block diagram of an embodiment of the apparatus shown in FIG. 1 and/or FIGS. 7 and 8.

According to an embodiment of the invention the apparatus 14 includes a function for statically aligning a first shaft with a second shaft. According to an embodiment a function F16 for aligning a first shaft with a second shaft can be performed by connecting a first dual-axis position sensing detector providing a first signal and a second dual-axis position sensing detector providing a second signal to port 16 of the analysis apparatus (FIG. 2, FIG. 12). When executing the function F16 for aligning shafts, the user interface 106 of apparatus 14 operates to provide readout means having defined alignment conditions and being responsive to the first signal and the second signal for visually displaying shaft alignment, whereby with adjustment of the first shaft with respect to the second shaft, alignment of the first shaft with the second shaft will be indicated on the readout means according to the defined alignment conditions. In order to perform the alignment function an alignment detection device comprising the first dual-axis position sensing detector for generating the first signal and the second dual-axis position sensing detector for generating the second signal is connected to port 16. The alignment detection device also comprises first mount means for mounting the first dual-axis position sensing detector to the first shaft;

second mount means for mounting the second dual-axis position sensing detector to the second shaft;

a first alignment radiation source mounted on the first mount means and oriented to provide a first alignment radiation beam to the second dual-axis position sensing detector to generate the second signal; and a second alignment radiation source mounted on the second mount means and oriented to provide a second alignment radiation beam to the first dual-axis position sensing detector to generate the first signal. According to an embodiment of the invention, the apparatus 14, when executing the alignment function in co-operation with the alignment detection device, operates as disclosed in U.S. Pat. No. 4,518,855, the content of which is hereby incorporated by reference.

According to an embodiment of the invention the apparatus 14 also includes a function F17 for balancing a rotating shaft. Also a device to be balanced can be attached to an already balanced shaft of a machine, and thereafter the apparatus 14, when executing the function F17 for balancing, will operate to provide information about the position and weight of the balancing weight(s) needed to counteract an imbalance of the rotating device. The apparatus 14, when executing a version of the function F17 for balancing, will operate to provide information about weight to be removed from the device-to-be-balanced in order to counteract an imbalance and information about the position where that weight needs to be removed. Removal of weight can be achieved, e.g. by drilling.

A Usage Debiting/Crediting Procedure

FIG. 5 is a flow chart illustrating an embodiment of a procedure according to the invention. An operator planning to perform a round of measurements may first consider what type of measurements and analysis is to be done, i.e. what type of Machine Condition Monitoring function is required. The choice of Machine Condition Monitoring function depends on the type of machinery to be inspected, and on how advanced an evaluation the operator intends to achieve, as described above.

A user help function, provided among the basic functions 80 in the first memory segment 70, can be activated by the operator to provide information about the purpose of any individual function F1-Fn. This can advantageously contribute to a stepwise increase of the competence of the operator, since the operator may start using relatively simple MCM functions and then, being informed by the user help function, the operator may choose to proceed to using more advanced functions.

Once the operator has decided that he will need to enable a presently disabled function from the group consisting of functions F1-Fn the operator may activate the Usage Debiting/Crediting Routine 132 (FIG. 4). The Usage Debiting/Crediting Routine 132 can also be used for changing the value of a level parameter. The value of the level parameter decides the extent to which the analysis apparatus 14 may be used, as described in further detail below.

The Usage Debiting/Crediting Routine 132 (FIG. 4) is one of the basic functions 80 in the first memory segment 70, which is described in connection with FIG. 4 above.

By means of the user interface 102,106 (FIG. 2) the operator can activate the Usage Debiting/Crediting Routine, as illustrated by step S110 in FIG. 5.

In step S120 (FIG. 5), the Usage Debiting/Crediting Routine 132 causes the apparatus 14 to display a list of the available functions, e.g. via the user interface 102/106 (FIG. 2). This may include a listing of a plurality of different functions and an indication about status for each individual function. According to a preferred embodiment the status information indicates for each function whether it is disabled or enabled. For the enabled functions the status information may also include information about the remaining amount of use for the associated function. The remaining amount of use for the associated function is indicated by variables Use_F1 and Use_F2, respectively, for the functions illustrated in FIG. 4. As illustrated in FIG. 4, there may be a status field 142 associated with each function F1, F2, F3 ... Fn, the status field 142 comprising information about whether it is disabled or enabled and, when enabled, information about the remaining amount of use for the associated function. According to this embodiment the level parameter may be a counter value, herein referred to as "Use_$F_k$", where k is an integer indicating the association with the corresponding function F1, F2, F3 ... Fn. Hence, function F1 is associated with level parameter "Use_$F_1$", and function F2 is associated with level parameter "Use_$F_2$" etc.

In step S130 the operator selects to buy more usage of a function. In response thereto a request for an additional amount of usage is generated (S140).

According to an embodiment the request includes information identifying the function whose usage is to be increased, and payment information. The payment information identifies a person responsible for paying the cost of the requested usage or, alternatively the payment information can in itself effect payment. The payment information may include data such as a credit card number. According to another embodiment the payment information may include information indicating that payment has already been effected.

According to an embodiment, the above mentioned request includes information identifying the individual analysis apparatus, and the function whose usage is to be increased, and payment information.

The request is delivered to the premises 28 of a supplier (S150). According to an embodiment the request is delivered by means of the communications network 18 (FIG. 1). Hence, request may be delivered from the apparatus 14 to the server computer 20, e.g. via data communication.

At the supplier premises 28 the request is processed (S160), the processing including a verification step for establishing whether the request is to be granted or not. The verification may, for example, include an evaluation of the payment information to decide whether the payment information satisfies certain predetermined payment criteria. According to a preferred embodiment the request is processed automatically by the server computer 20.

According to an embodiment this payment information evaluation includes a step of checking whether the payment information indicates that payment has already been effected, or whether it merely indicates a person responsible for paying the cost. If the payment information merely indicates a person responsible for paying the cost, the server computer 20 may proceed to check with a dedicated database for establishing whether clearance may be given for this person. The dedicated database may include information about the financial situation for the person responsible for paying the cost. According to one embodiment, the server computer limits this clearance check to a verification using data in the database 22 internal to the premises of the supplier 28. According to another embodiment the payment evaluation includes a communication with a financial services database.

Step S170 illustrates that if step S160 results in the request being granted, the supplier will deliver a key to the client (S180). If, on the other hand, the request is not granted, the supplier computer 20 will generate a Request_denied-message. The Request_denied-message may be delivered to a supplier sales person (not shown) for the purpose of alerting the supplier about a failed attempt buy function usage. According to an embodiment, a Request_denied-message is also sent to client part 4 (See FIG. 1) for causing the apparatus 14 to display information to the effect that the request was denied. The Request_denied-message may include information indicative of the reason for denial of the request, as well as a copy of the original request message, as described in step S140 above.

In step S190 the key is received in the apparatus. The reception of a key may be achieved via the user interface 102, 104, 106, 182 (See FIGS. 2, 7, 9, 12 and 15). Alternatively the key may be received via port 16.

After reception, there is a verification procedure S200 for ascertaining the validity of the key. The result of the verification procedure S200 is an acceptance or a discarding of the key. If the key is not accepted, the apparatus will provide a non-acceptance indication by means of the user interface 106 (Step S210).

If the key is accepted the apparatus 14 will, in response to the key, amend (step S220) a level parameter "Use_$F_k$" to change an amount of usage status and/or the enabled/disabled parameter 143 for the selected function.

According to an embodiment, the key is associated with the selected function so that, when correctly applied to the apparatus 14, the key will increase the allowed amount of usage of that function. In other words, the key may cause a level parameter associated with the selected function to be amended. The level parameter associated with a selected function is a parameter whose purpose is to indicate how much the apparatus 14 may execute the selected function.

With reference to FIG. 4, an embodiment of the invention involving a level parameter is described. According to this embodiment the level parameter may be a counter value, herein referred to as "Use_$F_k$", where k is an integer indicating the association with the corresponding function F1, F2, F3 ... Fn. Hence, function F1 is associated with level parameter "Use_$F_1$", and function F2 is associated with level parameter "Use_$F_2$" etc. According to this embodiment, the key will include a first data portion for associating the key with the corresponding function F1, F2 or F3 etc; and a second data portion for indicating the amount of use purchased.

After execution of step S220, the user interface of the apparatus will present information (step S230) for the purpose of allowing the operator to select a next operation to be executed. This includes selecting between e.g. starting a measurement, returning to step S110 for repeating the above procedure, or turning off the apparatus 14.

EXAMPLE 1

FIG. 5C is a simplified illustration of a principle of an embodiment of an account value or amount of usage parameter for use in an apparatus wherein a user pays to get a number of credits, also referred to as "units of use". It is noted that in the Example 1 embodiment the computer program routine "Function_F1" becomes disabled when the parameter Use_F1 reaches a first reference value (zero in the example).

This example describes an embodiment relating to the above-mentioned procedure. When a client has purchased e.g. ten units of use for the computer program routine "Function_F1" (See FIG. 4), the amount indication portion of the key may cause the parameter Use_F1 to increase by ten units. Hence, if the parameter Use_F1 had a numerical value zero (0) before reception of the key, then the parameter Use_F1 will have numerical value "10" (ten) after correct reception of that key. For each execution of the computer program routine "Function_F1" the numerical value of the parameter Use_F1 will be decreased by one (1). When the computer program routine "Function_F1" has been executed ten times so that the parameter Use_F1 again has the numerical value zero (0), the computer program routine "Function_F1" will become disabled.

In order to enable the computer program routine "Function_F1", the client can purchase a new amount of use by means of the procedure described above.

EXAMPLE 2

This example describes an embodiment similar to the Example 1 embodiment above. According to example 2, the cost per use changes after a certain level of use has been attained. A user can enter a number Ap of credits or units of use for a selected function, such as function F1, by means of entering a key. When the function F1 is executed by the apparatus 14 the use of the condition monitoring function F1 will be registered by deducting e.g. one credit for each execution. However, the method may also include the steps of:

reading a current value of said registered use;

comparing said current value with a second reference value;

registering use at a first rate when said current value is above the second reference value; and registering use at a second rate when said current value is below the second reference value.

This advantageously enables a supplier to sell usage at different costs. When, according to one embodiment, a user has paid for a certain amount $A_p$ of usage, the second reference value is a level indicating that the amount $A_p$ of usage already paid for has been spent. This means that any further use will be usage which has not yet been paid for. By the feature of registering such further use at a second rate it is possible to charge a higher cost per unit of usage for such further use. Accordingly, one execution of the function F1, when registered at the second rate, may result in a deduction of two credits.

FIG. 5D is an illustration of Example 2. A user, when entering a number Ap of credits or units of use for a selected function, such as function F1, by means of entering a key for the first time, will get Ap credits that will be deducted at the first rate. Assuming that the user has bought ten credits (Ap=10), the parameter Use_F1 will assume the value 10. Hence, if the first rate is deduction of one credit per execution of function F1, the parameter Use_F1 will assume the value zero ("0") after ten executions of function F1. When the value zero ("0") is the second reference value, any further execution of the function F1 will be registered at the second rate, e.g two credits per execution. Hence, the user will advantageously still be able to use the function F1, although this use has not yet been paid.

If the first reference value is −4, as illustrated in FIG. 5D, the apparatus will allow the function F1 to be executed twice before the parameter Use_F1 assumes the first reference value "minus four" (−4). When the parameter Use_F1 assumes the first reference value, the computer program routine "Function_F1" will become disabled.

However, next time that the user enters a key indicating a value of ten credits, the parameter Use_F1 will assume the value six, since it starts from a negative value:

$$-4+10=6$$

The above example values of first and second reference values are merely examples. Of course, the number of credits, and the reference values may have other values without departing from the inventive concept described herein. Additionally, the amount of use may be counted as duration of time, the first and second reference values also being indicative of time duration. For example a user may buy allowance to use a selected function for a first total period, e.g. sixty hours, the second reference value being indicative of a time when the charge rate is to be changed, and the first reference value being indicative of a when disabling occurs.

An Embodiment of a Usage Registering Procedure

Figure 6:
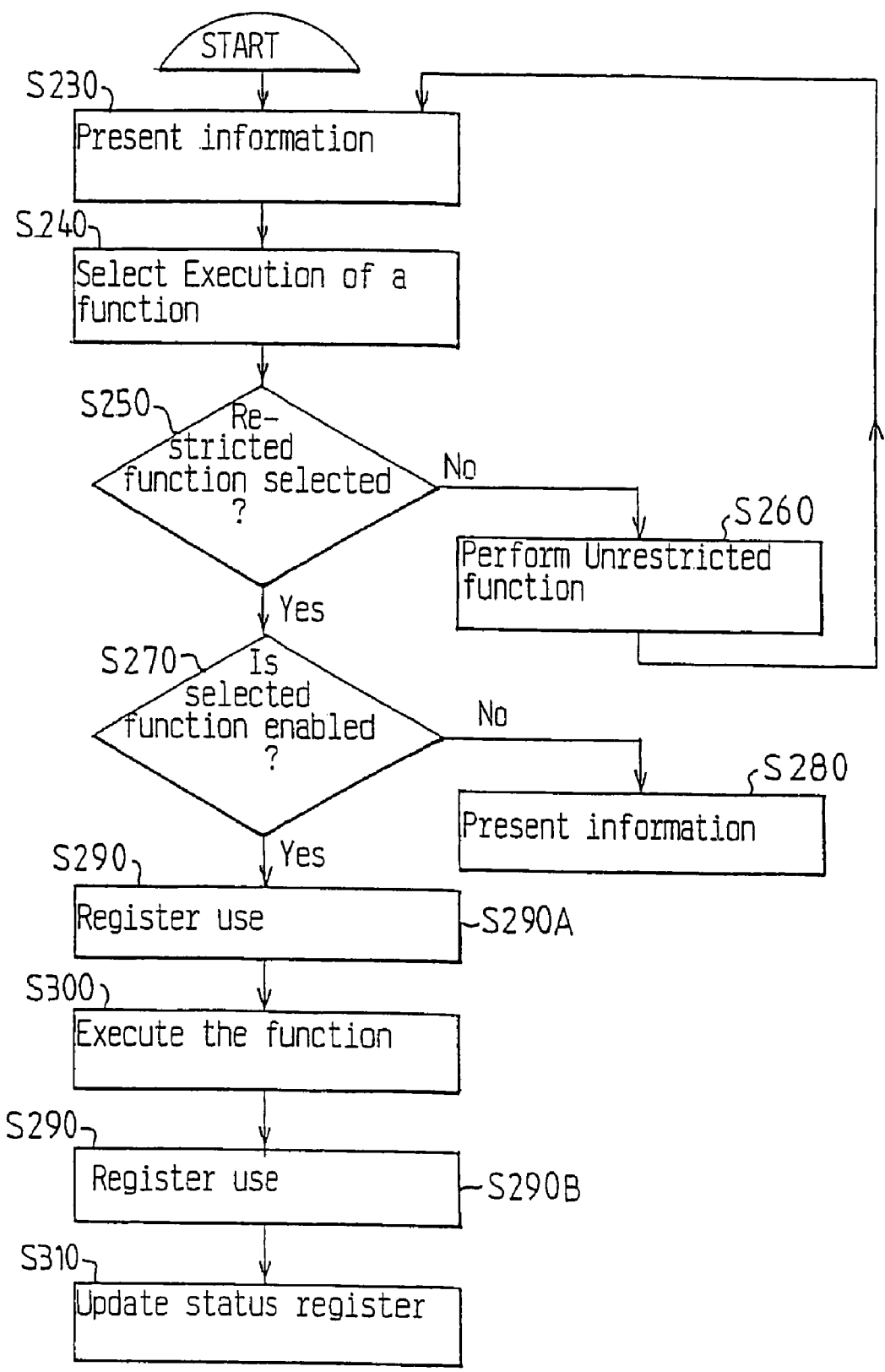
FIG. 6 is a flow chart illustrating an embodiment of a procedure according to the invention.

FIG. 6 is a flow chart illustrating an embodiment of a procedure according to the invention.

The procedure may start with step S230, i.e. the user interface of the apparatus presents information for the purpose of allowing the operator to select a next operation to be executed.

In step S240 the operator selects to request the apparatus to perform a Condition analysis function. This means that the operator may select one of the functions whose use is to be registered. The operator may do this by means of the user interface 102,106.

In a step S250 (FIG. 6) the computer program 80 (FIG. 4) will in response to the operator input check whether the selected operation involves any of the of the functions whose use is to be registered. The functions whose use is to be registered includes the above discussed MCM functions F1-Fn. A function whose use is to be registered is referred to as a "restricted function" in the following text.

If the selection involves only unrestricted functions the apparatus 14 (FIG. 2) will initiate and perform such operation (step S260) and then return to step S230. If a restricted function is selected, the computer program 80 (FIG. 4) will in response thereto check whether the selected function is enabled or disabled (Step S270).

If the selected function is disabled, the computer program 80 will present information to this effect (S280), and offer to proceed to any of steps S230, step S10 or S120, described above. According to an embodiment, the program 80 will offer to proceed with step S470 in the procedure described in FIG. 14.

If the selected function is enabled, the computer program 80 will register the use of the selected restricted function (S290), and execute the selected restricted function (Step S300). Although FIG. 6 illustrates a certain order between activities, it to be understood that the invention is not restricted to performing the steps in that particular order. In particular, the registration of use (step S290) may be performed before or after or sometime during the execution of the restricted function.

According to a preferred embodiment the use is registered by changing the value of a counter parameter $Use\_F_k$. The index k in "$Use\_F_k$" indicates association to function $F_k$. When the parameter $Use\_F_k$ has a value 100, this may indicate that one hundred units of use remains. One unit of use may correspond to one complete execution of the function $F_k$. Hence, according to an embodiment, the counter parameter $Use\_F_k$ can correspond to the number of times the function $F_k$ may be used before all the allowed use has been spent; With reference to FIG. 4 step S290 may therefore include amending the parameter Use_Fk in status field 142 for the selected function to update the information indicating the remaining amount of use.

After successful execution and registration of use the computer program 80 may update a status register or status field 142 (step S310). Such update may include updating any and all variables/parameters needed for delivering status information correctly next time step S120 is performed (See FIG. 5 and corresponding description). Hence, step S310 may include detection of a usage parameter value Use_$F_k$ indicating that a certain act is to be performed in response to the changed status. For example, if a parameter indicates that all usage for one or all restricted functions has been spent, the said certain act may include disabling the restricted function or functions. Such disabling may include erasing a decrypted version 110, so that only encrypted versions remain.

FIG. 7 is a physical embodiment of an apparatus 14. The apparatus has an apparatus body; and a display 106 provided on at least one surface of said apparatus body. Also provided on the body is a user input interface 102 comprising a key board 103.

The apparatus body is portable; and it is shaped and adapted to enable a one-hand grip, as illustrated in FIG. 9. FIG. 9 illustrates the apparatus 14 being gripped by a hand 140 of a user. Moreover the user input interface 102 is positioned and adapted so as to enable user interaction by means of the user hand 140. In the embodiment shown in FIG. 9 the user input interface 102 is operable by means of a thumb 150 of the user.

Figure 8:
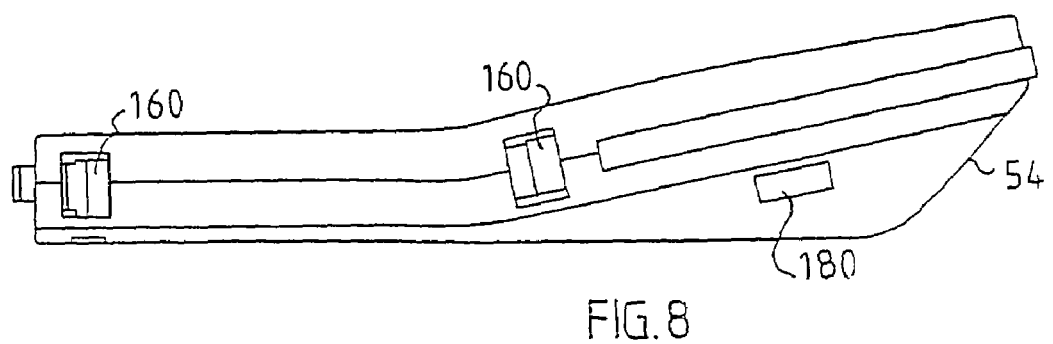
FIG. 8 is a side view of the apparatus shown in FIG. 7.

FIG. 8 is a side view of the apparatus shown in FIG. 7. The apparatus body is provided with fasteners 160 for a wrist strap 170. The wrist strap 170 is illustrated in FIG. 9.

The body also has a holder 180 for an elongated device. The elongated device may be a pen or a pointing device for user input via the display 106. The display 106 may be a touch sensitive display allowing user input by means of the pointing device. The display 106 therefore includes a display area which is provided with touch sensors 182, also referred to as a touch screen 182, co-operating with a touch input interpreter. Hence, the display may comprise an LCD unit, for displaying images and text, having integrated touch sensor means for detecting user input via the display area.

The provision of touch sensors 182 for receiving user input via the area of the display 106 provides for an improved user interaction. For example, as described above, the function F13 may include presentation of an actual condition value and a plurality of stored condition values so that trends may be presented on the display 106, wherein each condition value is associated with a time and/or date. When such a trend is displayed, for example in the form of a curve indicating the temporal progression of the condition of the machine, the user may touch the screen at an interesting part of the curve for the purpose of obtaining information associated with that part of the curve. In response to such user interaction the apparatus may therefore display e.g. the time and date information associated with that part of the curve.

FIG. 12 is a block diagram of an embodiment of the apparatus 14 shown in FIG. 1 and/or FIGS. 7 and 8. The apparatus according to the FIG. 12 embodiment may comprise a memory 60 having a plurality of program functions F1, F2, F3 . . . Fn, where n is a positive integer. Each one of the functions F1, F2, F3 . . . Fn may be individually enabled/unlocked or disabled/locked.

The memory 60 includes program functions for causing the data processing means 50 to perform the methods described with reference to FIGS. 5 and 6. Hence, the memory 60 includes a program function 140 (FIG. 4) for registering use of any of the functions F1, F2, F3 . . . Fn. The program function 140 may be referred to as a logger, which operates to update the above mentioned use parameters Use_Fk.

Moreover, the memory 60 also includes a program function 141 for changing the state of an individual selected condition monitoring program function between an enabled state and a disabled state. The state control function 141 may operate to read the parameters Use_Fk, as described in connection with step S310 in FIG. 6 above. The state control function 141 may operate to disable a function Fk in response to the outcome of a comparison between a parameter Use_Fk and a first reference value Rk. The first reference value Rk is a reference value indicative of a limit. The state control function is adapted to disable function $F_k$ when the parameter Use_Fk reaches the first reference value Rk.

The apparatus 14 includes data processing means 50 in the form of a central processing unit (CPU) 50A co-operating with a Field Programmable Gate Array circuit (FPGA) 50B. According to an embodiment the central processing unit 50A operates to execute the basic functions 80, such as the program functions for causing execution of the methods described with reference to FIGS. 5 and 6. The Field Programmable Gate Array circuit S0B is programmable to execute the functions F1, F2, F3 . . . Fk . . . Fn. In effect, the CPU 50A, in response to the basic program functions 80 and user input, operates to control the operation of the FPGA S0B. The CPU 50A may, for example, control which of the functions F1, F2, F3 . . . Fk . . . Fn are to be executed by the Field Programmable Gate Array circuit S0B.

The Field Programmable Gate Array circuit S0B advantageously provides a combination of flexibility and very high performance to the apparatus 14 in that the functions executed by the FPGA may be software controlled and the FPGA allows for truly parallel processing. Hence, a large amount of data can be processed relatively fast by means of the FPGA. This solution advantageously enables simultaneous execution of two, three or more of the condition monitoring functions F1, F2, F3 . . . Fk . . . Fn. The apparatus 14 is highly versatile and flexible in that it can be upgraded to perform new functions simply by adding or changing a program. Hence a new or different condition monitoring function can be added to the apparatus 14 by a simple upgrade of the programs in memory 60 (FIG. 2, FIG. 3, FIG. 4, FIG. 12). When the changed program runs on the FPGA the new function can be executed without necessarily changing any of the hardware in the apparatus 14.

Moreover, the FPGA provides a large processing capability in relation to the amount of space it requires. The FPGA may be mounted on a circuit board, where it requires a small surface in relation to the large processing capability it provides. According to an estimate, the amount of surface saved on a circuit board by using an FPGA exceeds 25%. In other words, the volume of the apparatus 14 can be significantly reduced while the data processing capability is maintained or increased as a result of using an FPGA circuit in the apparatus 14. Therefore the choice of FPGA contributes to enable the provision of a portable instrument satisfying the conflicting requirements of having a large processing capability and a compact instrument which makes it easier to carry for the user.

Additionally the FPGA has a low power consumption as compared to traditional logic circuits as well as when compared to traditional data processors.

The FPGA 50B is coupled to receive digital Shock Pulse Measurement data from an A/D-converter 44A, which is coupled to an input 42A for an analogue Shock Pulse Measurement signal (SPM signal). The FPGA 50B is also coupled to receive digital temperature data from an A/D-converter 44B, which is coupled to an input 42B for an analogue temperature measurement signal. The FPGA SOB is also coupled to receive digital vibration data from an A/D-converter 44C, which is coupled to an input 42C for an analogue vibration measurement signal. Moreover the FPGA 50B is coupled to receive digital data from an A/D-converter 44E, which is coupled to an input 42E for an analogue measurement signal indicative of a measured electric voltage or a measured electric current. The FPGA SOB is also coupled to an input 42D for receiving binary tachometering measurement signals.

The FPGA 50B is also coupled to a communications interface 54 for bi-directional communication with a device 59 on a machine 6, as described in connection with FIG. 2.

Moreover the apparatus 14 includes a user interface 102. The user interface 102 includes a display 106 having touch sensors 182 for associating information displayed at a certain position of the display area with user activation of the sensor at said certain position. In the block diagram of FIG. 12 the touch sensor 182 is illustrated as a block separated from the display 106. In a physical embodiment, however, the touch sensors 182 are integrated with the display area 106, as illustrated in FIG. 7, such that the touch sensors 182 detect user interaction with the display area 106.

The CPU 50A is coupled to a data port 16 as described in connection with FIG. 1, for enabling communication with a supplier computer 20.

The apparatus 14 also includes clock functionality 210 for providing time and date information. This is useful for generating a time stamp, e.g. when a condition value has been produced, and the value is to be stored for future retrieval. Additionally, the time and date information may be used for controlling the enabling and disabling of functions F1, F2, F3 ... Fk ... Fn. According to an embodiment, the apparatus 14 may receive, via port 16, a key comprising a code for enabling a selected function from a first predetermined date, such as e.g Mar. 1, 2003, until a second date such as Apr. 15, 2003. Such a key may include a data portion indicative of the identity of the analysis apparatus, a data portion indicative of the function to be enabled, a data portion indicative of the first date and a code portion indicative of the second date.

Alternatively the key may cause a selected function to be enabled for a certain duration starting from a certain date.

According to an embodiment the apparatus comprises a logger operating to register the amount of use for one, some or all condition monitoring functions, as described above. This may be done by counting the number of executions of the restricted functions, as described above. According to an embodiment a Reporting function is provided, among the Basic Program Functions 80 (FIGS. 3 & 4), for causing the apparatus 14 to deliver a report about the accumulated registered use. The reporting function is adapted to deliver such a report with a certain periodicity. For example, the Reporting function may be set to deliver a report no less than once every 30 days. The reporting function is set to deliver the report via the port 16 for transmission to the supplier computer 20 via the communications network 18 (FIG. 1). Upon reception of the report, the supplier computer may be adapted to cause an output to the supplier indicative of the amount of use accumulated for that particular analysis apparatus. Alternatively the supplier computer may be arranged to automatically generate an invoice with a certain regularity, such as no less than once every 30 days, the invoice thereafter being delivered to a user associated to the analysis apparatus. For this purpose the usage report may include data indicative the identity of the user. This may be achieved by providing unique identities for each analysis apparatus, and keeping, at the supplier, a data base 22 associating each unique analysis apparatus identity with a corresponding client/user. The reporting function co-operates with the timer functionality 210 such that if no usage report has been transmitted at the expiration of the certain period, the timer co-operates with the State control function 141 to disable one, several or all the restricted functions F1, F2, F3 ... Fk ... Fn.

According to another embodiment the apparatus 14 expects to receive a receipt from the supplier part 20, 28 after sending a usage report. The receipt should include information, preferably in a coded manner, indicating that the usage report has been received by the supplier part 20, 28. If no receipt has been received within a first time period the apparatus will provide a warning to the user by means of the user interface 106. If no receipt has been received within a longer, second time period the apparatus will disable one, several or all the restricted functions F1, F2, F3 ... Fn.

Figure 15:
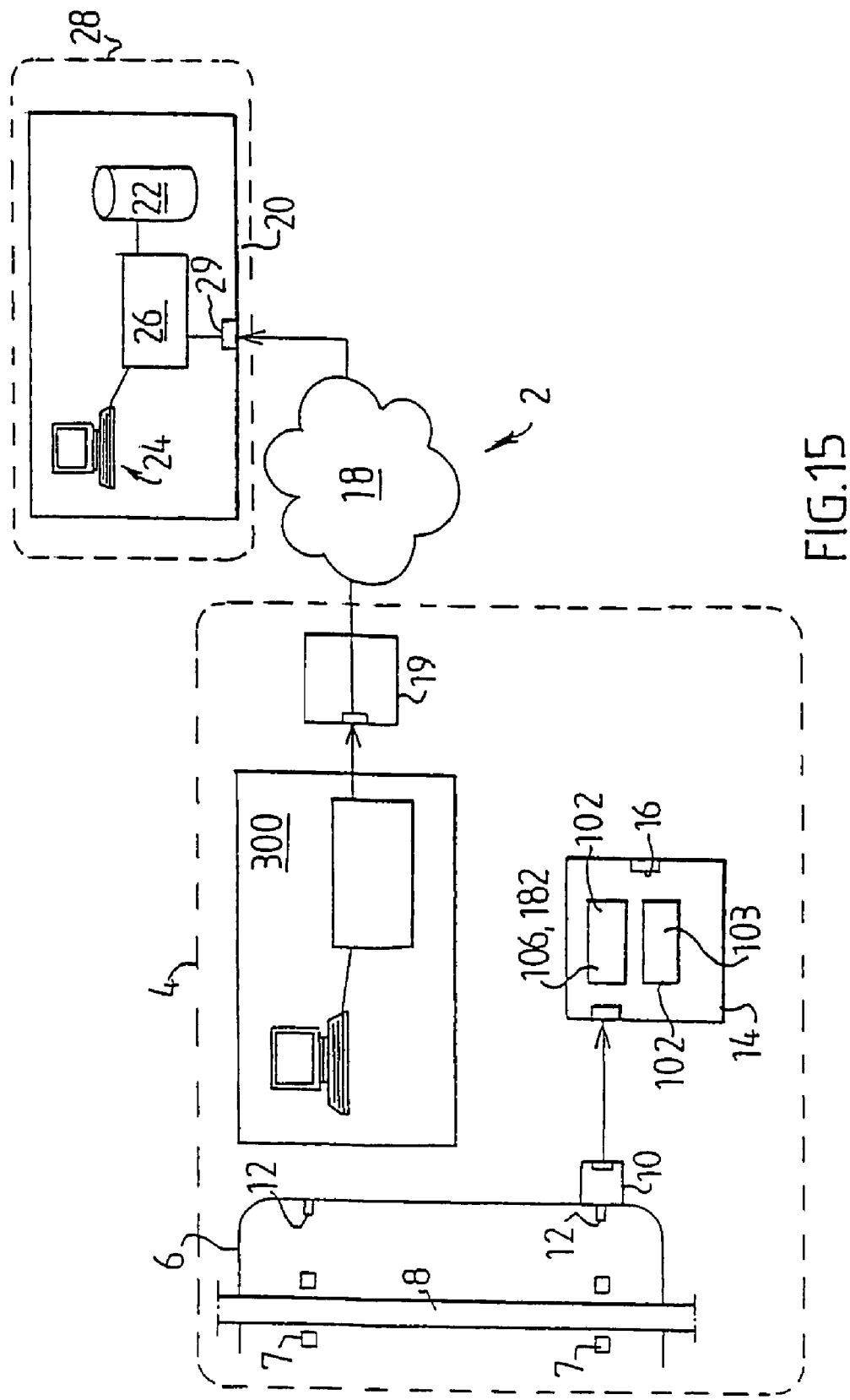
FIG. 15 shows a schematic block diagram of another embodiment of a condition analyzing system 2.

FIG. 15 shows a schematic block diagram of another embodiment of a condition analyzing system 2. According to the FIG. 15 embodiment the client part 4 comprises an apparatus 14, and a separate client computer 300. The client computer 300 may be connectable to a communications network 18, e.g. via a data interface 19. The communications network 18 may be the world wide internet, also known as the Internet. The communications network 18 may also comprise a public switched telephone network. The supplier part may be able to exchange information with the computer 300 via the communications network 18, e.g. in the manners discussed above in connection with FIG. 1.

According to an embodiment the apparatus 14 is connectable to the computer 300 via port 16, for exchanging information relating to usage. According to a preferred embodiment the apparatus 14 is capable of delivering the above mentioned usage report to the supplier via the computer 300. According to an embodiment information exchange between the apparatus 14 and the computer 300 may be achieved by transfer of a writeable memory device connectable to the computer 300 as well as to the apparatus 14. Information exchanged in this manner may include the above mentioned usage report, and/or the above mentioned receipt indicating to the apparatus 14 that the usage report has been received by the supplier part 20, 28. The coded information in the receipt may also be read by a user from the user interface of computer 300, and input into the apparatus 14 by means of user interface 106, 182, 103.

FIG. 13A illustrates a part of memory 60 comprising a function $F_k$ and an associated status field 142. The status field 142 includes a segment 143 for data indicative of the state of the associated function: enabled or disabled. The status field 142 also includes a segment 144 having data indicative of the cost $C_{fk}$ for executing the associated function $F_k$. For example, function F1 may have a cost value $C_{fk}=1$ charging unit per execution, and function F3 may have a cost value $C_{fk}=3$ charging units per execution. In another example, function F1 may have a cost value $C_{fk}=1$ charging unit per unit of time, whereas function F3 may have a cost value $C_{fk}=3$ charging units per unit of time. Hence, different functions may be charged at different cost rates, by providing a certain exchange rate between one charging unit and a certain monetary currency. For example one charging unit may correspond to x US cents, where x is a number such as 10, 15, 50, 100, 1000 or another number dependent on what price is suitable.

An alternative embodiment for registering use, i.e. an embodiment of step S290 in FIG. 6, is as follows: The use maybe registered by counting a duration of execution of a restricted function, in which case the registration of use may include a registration of a start time in a step S290A (as indicated in FIG. 6) and the registration of a stop time in a step S290B. In such an embodiment the step S290A may be performed immediately before the execution of the restricted function, and the step S290B is executed immediately thereafter. According to this embodiment the parameter Use_$F_k$ may be indicative of a total duration of time the function $F_k$ has been activated. FIG. 13B illustrates a part of memory 60 according to this embodiment, comprising a function $F_k$ and an associated status field $142_k$. The parameter Use_$F_k$, indicative of an accumulated total duration of active time for the function $F_k$, is stored by the logger in a segment $220_k$ in status field $142_k$. A reference duration value is stored in segment $230_k$, and a cost factor may be stored in a segment $240_k$. The reference duration value is set by reception of a key, and it indicates an amount of use that has been paid for. According to this embodiment the state control function may be arranged to disable Function $F_k$ when the parameter Use_$F_k$ in segment 220 is equal to the reference duration value in segment $230_k$. Different charges per time unit for different functions $F_k$, $F_i$ may be obtained by a multiplying the duration of execution of a restricted function $F_k$ with a cost factor $C_k$, and multiplying the duration of execution of another restricted function F1 with a different cost factor $C_i$. The cost factors for functions $F_k$ and $F_i$, respectively, may be stored in a memory segments $240_k$ and $240_i$ respectively. In accordance with the same principle, different charges per execution for different functions $F_k$, $F_i$ may be obtained by a multiplying the number of executions of a restricted function $F_k$ with a cost factor $C_k$, and multiplying the number of executions of another restricted function $F_i$ with a different cost factor $C_i$. In this manner the mutually different functions $F_k$, $F_i$ can be charged at different costs per execution.

Another Embodiment of a Usage Debiting/Crediting Procedure

This embodiment differs from the Usage Debiting/Crediting Procedure described with relation to FIG. 5 in that there is provided a centralized debit/credit account parameter 250 rather than separate accounts for each function. There is a plurality of restricted functions having individually settable states: either disabled or enabled. The enabling/disabling procedure is a separate procedure being performed in response to a state key associated with the selected function. There is a separate credit/debit key for allowing a supplier to amend the value of the centralized debit/credit account parameter 250.

According to this embodiment the request includes information identifying the individual analysis apparatus, and payment information. The key to be received may cause a level parameter associated with the use of all relevant functions in that individual analysis apparatus to be amended. Hence, such a level parameter may be associated with all MCM functions.

Whenever a client operator selects to use a restricted function, the amount of use is deducted from centralized debit/credit account 250. Only those functions which are in the enabled state can be activated for execution, provided the centralized debit/credit account parameter 250 has a value above a first reference value. The first reference value is a limit value, such that if an operator attempts to execute a restricted function when the value of the centralized debit/credit account parameter 250 is equal to, or exceeds the first reference value, then the registering routine causes the apparatus 14 to disable all restricted functions.

One version of this embodiment further comprises the steps of:

reading a current value of the centralized debit/credit account parameter 250;

comparing said current value with a second reference value;

deducting credit units from the centralized debit/credit account parameter 250 at a first rate when said current value is above the second reference value; and deducting credit units from the centralized debit/credit account parameter 250 at a second rate when said current value is below the second reference value.

This advantageously enables a supplier to sell usage at different costs. When, according to one embodiment, a user has paid for a certain amount $A_p$ of usage, the second reference value is a level indicating that the whole amount $A_p$ of prepaid usage has been spent. This means that any further use will be usage which has not yet been paid for. By the feature of registering such further use at a second rate it is possible to charge a higher cost per unit of usage for such further use.

Moreover, the amount of use may be charged at different rates for different functions by means of individual cost factors ($C_k$ and $C_i$, respectively) associated with each individual function, as described above and as illustrated in FIGS. 13A and 13B.

The centralized debit/credit account parameter 250 may be stored in a memory location 260 in the memory 60, as illustrated in FIG. 4.

FIG. 14 is a flow chart illustrating an embodiment of a procedure for delivering an apparatus 14, and for adding use or functionality by means of a key from the supplier part 28. The method also relates to an embodiment of a method for generating a request for such a key or code. Such a key/code may be used for amending the centralized debit/credit account parameter 250 and/or for enabling a disabled function. Step S610 in FIG. 14 may include the procedure according to FIG. 6, starting e.g. with step S230. It is to be understood that FIG. 14 focuses on certain mathematical or technical details that may also be used in the context of the procedure described in connection with FIGS. 5A and 5B above. The method may start at the supplier 28 (FIG. 1, FIG. 15) before delivery of the apparatus. In a step S410 a code ki is set to a start value, which may be chosen to e.g. 0. Thereafter identity information is entered. This may be a number identifying an individual apparatus 14, or information identifying an individual condition monitoring function or both. A new code $K_{i+1}$ is generated in accordance with a first mathematical algorithm in dependence of the identity information and the previous code $k_i$ (S430).

The variable $K_i$ is updated to the value of the new code $K_{i+1}$ (step S440). The updated value $K_i$ is stored in the apparatus 14, and in the supplier database 22 (step S450). The copy stored in supplier database 22 is herein referred to as $K_{i22}$, and the copy stored in the apparatus 14 is herein referred to as $K_{i14}$.

The apparatus is delivered to a client/user (step S460). Thereafter the user may operate the apparatus as described in connection with FIGS. 5A,5B and/or FIG. 6.

At some point in time the user may want to buy additional use allowance. The user may then cause the apparatus to generate a request $U_R$ (Use Request) for additional Use allowance (step S470). Step S470 may be attained as described in connection with steps S130, S140 in FIG. 5A. The request $U_R$ is received in supplier computer 20 (step S480). In supplier computer 20 the code $K_{i22}$ is retrieved from database 22. The code $K_{i22}$ and the content of the request $U_R$ are used in a predetermined mathematical algorithm, and a checksum $S_{c1}$ with a certain number of bits is produced. Hence checksum $S_{c1}$ is generated in response to code $K_{i22}$ and the content of the request $U_R$ (step S500).

A new code $K_{i+1\_22}$ is generated in response to the old code $K_{i22}$ and identity information (step S510). This may be done in a manner analogous to step S430.

In step S520 the new code value $K_{i+1\_22}$ is stored in database 22 as updated code new code $K_{i22}$.

A key comprising the information in the request $U_R$ and the checksum $S_{c1}$ is delivered from the supplier (step S530). This may be achieved as discussed elsewhere in this document, e.g. as discussed in connection with FIG. 5A.

The key, comprising the information $U_R$ and $S_{c1}$ is received in apparatus 14 (step S540). This may be achieved as discussed elsewhere in this document, e.g. as discussed in connection with FIG. 5A (S190). A key verification procedure is performed, as discussed in connection with connection with FIG. 5A (S200). The key verification procedure includes calculating a checksum. In apparatus 14 the code $K_{i14}$ is retrieved from memory. The code $K_{i14}$ and the content of the request $U_R$ are used in the above in step S500 mentioned predetermined mathematical algorithm, and a checksum $S_{c2}$ with a certain number of bits is produced. Hence checksum $S_{c2}$ is generated in response to code $K_{i14}$ and the content of the request $U_R$ (step S550).

In a subsequent step S560, the generated checksum $S_{c2}$ is compared to the received checksum $S_{c1}$ (step S560 and step S570). If they are not identical an error message is displayed, as discussed in connection with S210 above in connection with FIG. 5B.

If they are identical then this means that the key is accepted, and the apparatus 14 proceeds to add the use allowance i apparatus 14 (step S600). Thereafter the user may use the apparatus, as discussed in FIG. 6 (step S610).

Figure 14A:
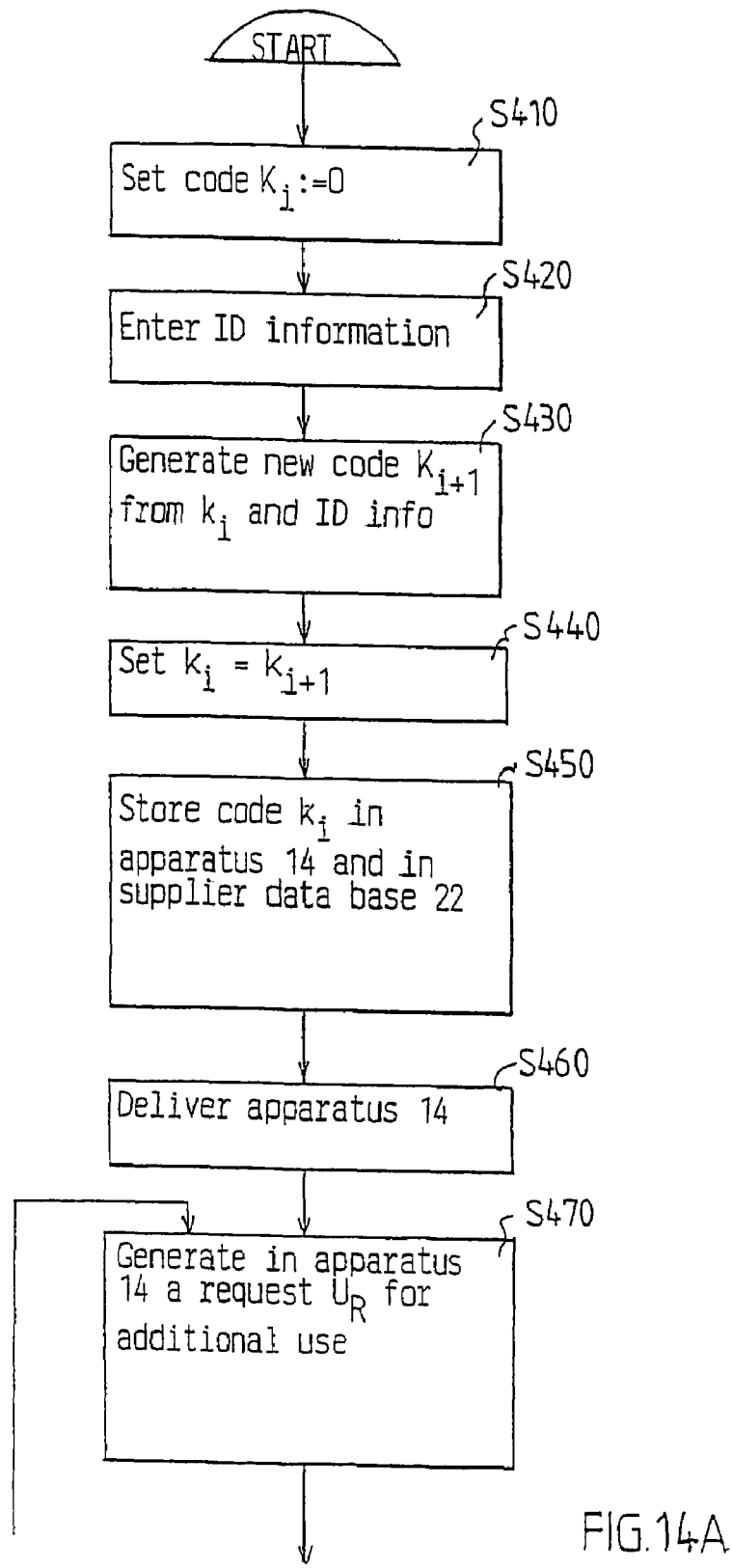
FIG. 14 is a flow chart illustrating an embodiment of a procedure for delivering an apparatus, and for adding use or functionality to the apparatus by means of a key from the supplier.
Figure 14B:
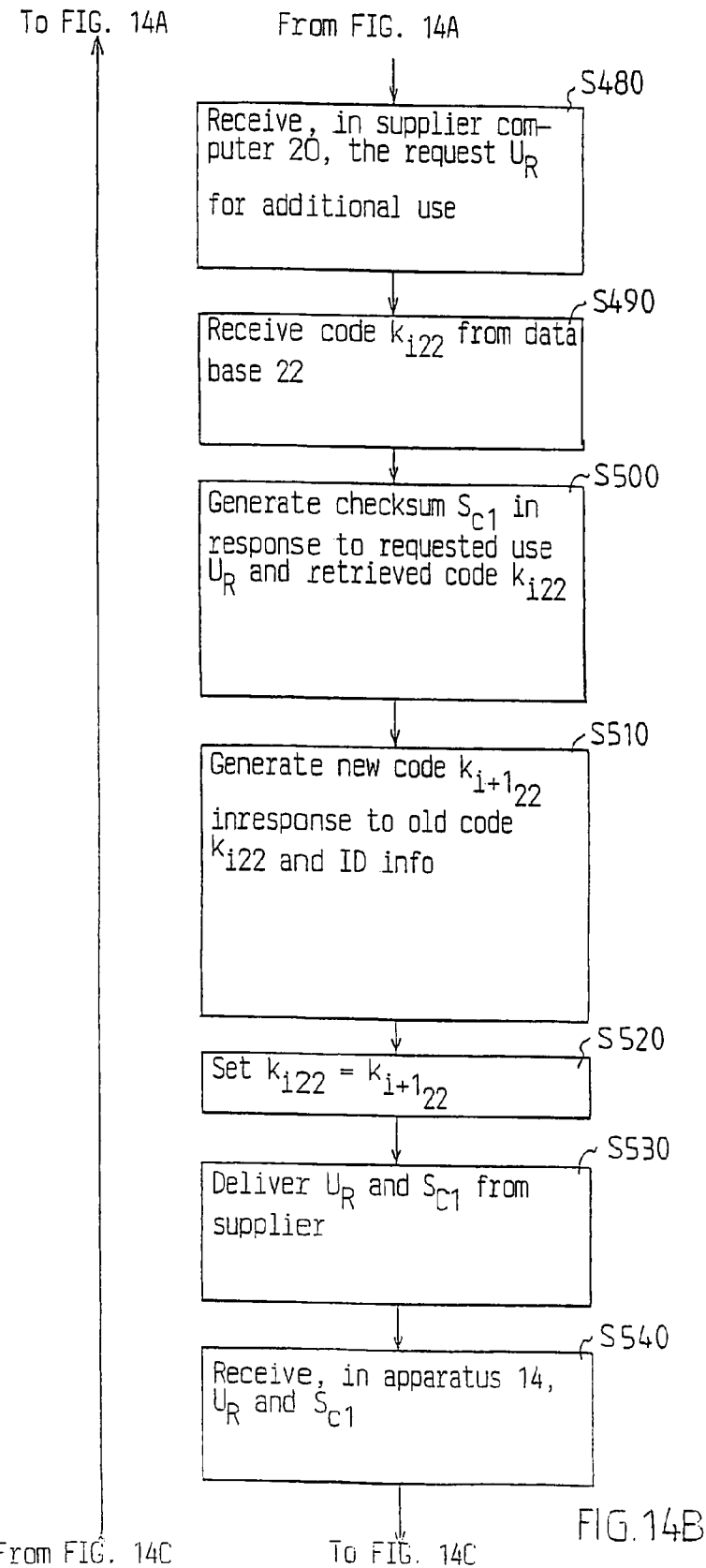
Figure 14C:
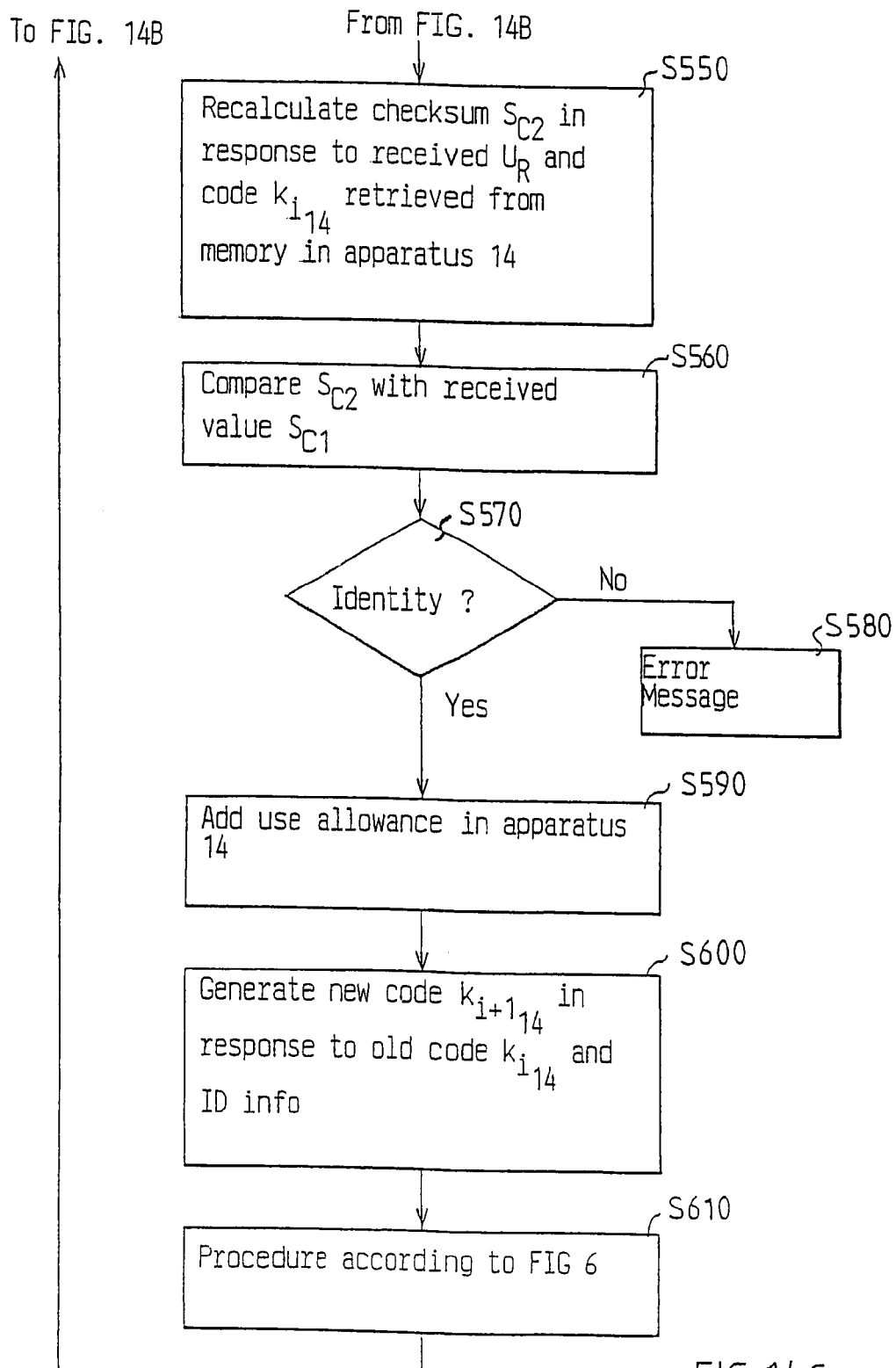

When additional usage allowance is desired the user may again request additional use, by following the above described procedure, starting with step S 470 as illustrated in FIGS. 14A, 14B, & 14C and as described above.

Figure 10:
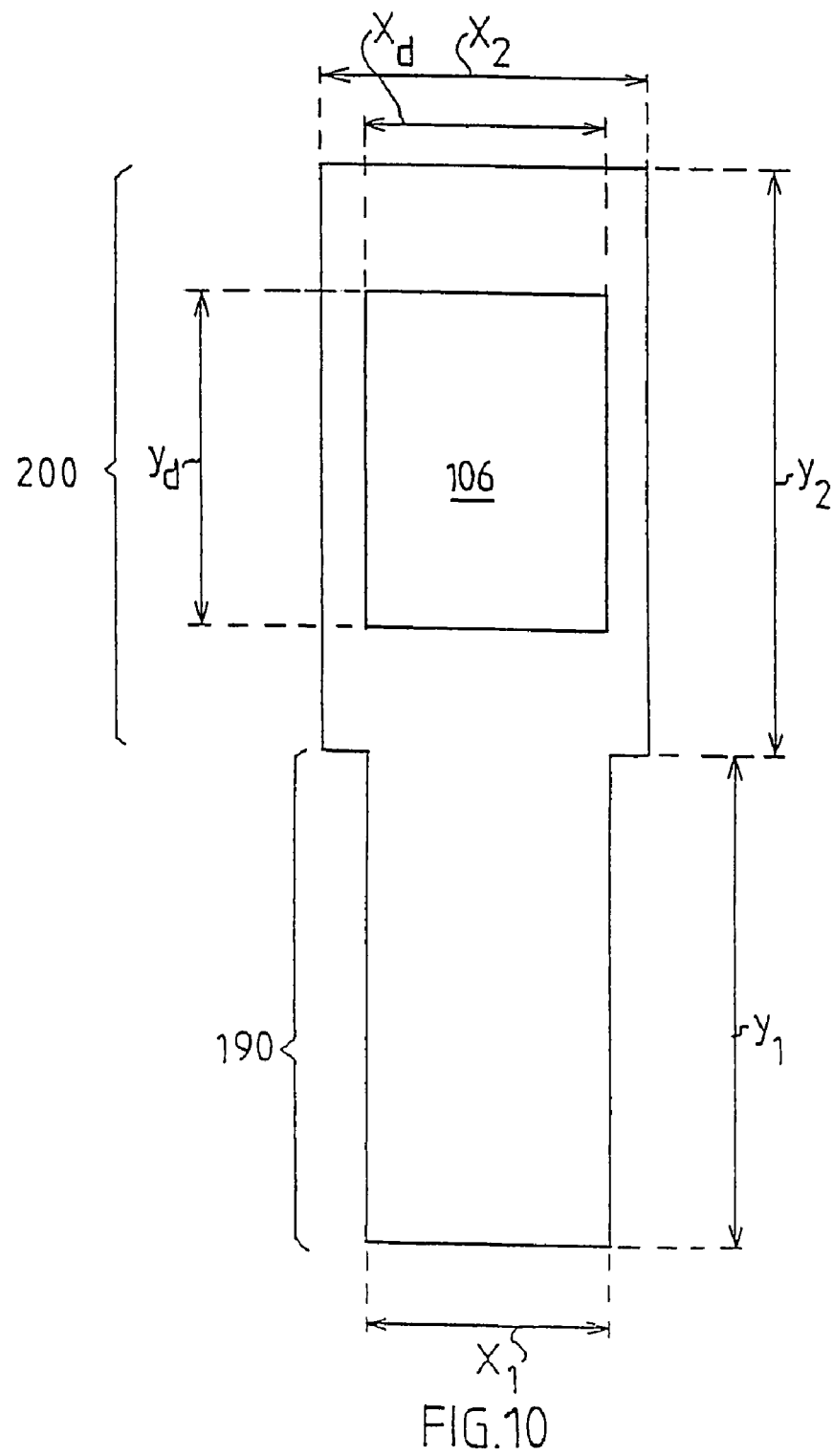
FIG. 10 is a top view of an embodiment of the apparatus, illustrating the physical dimensions thereof.
Figure 11:
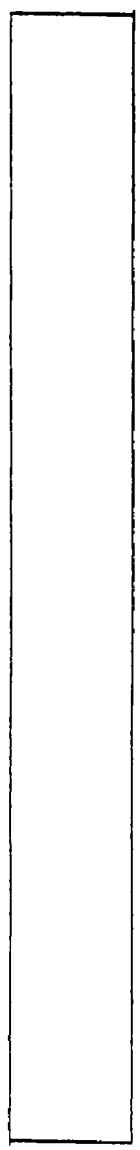
FIG. 11 is a side view of the apparatus shown in FIG. 10.

FIG. 10 is a top view of an embodiment of the apparatus 14, illustrating the physical dimensions thereof. FIG. 11 is a side view of the apparatus shown in FIG. 10.

The display 106 has an extension xd in a first direction and an extension Yd in a orthogonal direction such that the display area is at least 4125 mm².

The apparatus body has a first portion 190 adapted for gripping by a user. The first portion has an extension x1 in a first direction, an extension y1 in a second direction. The body has an extension z1 in a third direction, as illustrated in FIG. 11. The body also has a second body portion 200 having an extension x2 in a first direction, and an extension y2 in a second direction. The second portion comprises at least a part of the display 106.

According to an embodiment:
x1 is less than 80 mm
y1 is less than 140 mm
z1 is less than 35 mm
x2 is less than 100 mm
y2 is less than 160 mm
xd is at least 60 mm
yd is at least 80 mm This embodiment provides an apparatus 14 having a body volume of less than 952 000 mm³, and the display 106 has a display area of at least 4800 mm². Therefore the apparatus 14 is easily portable in a handheld manner, whereas the user interface is advantageously user friendly by means of a large display in relation to the body volume of the apparatus.

According to another embodiment:
x1 is less than 65 mm
y1 is less than 145 mm
z1 is less than 35 mm
x2 is less than 80 mm
y2 is less than 145 mm
xd is at least 60 mm
yd is at least 80 mm This embodiment provides an apparatus 14 having a body volume of less than 735 875 mm³, and the display 106 has a display area of at least 4800 mm². This embodiment of the apparatus 14 is even easier to carry in a handheld manner, while providing a large display in relation to the body volume of the apparatus.

According to yet another embodiment:
x1 is less than 60 mm
y1 is less than 120 mm
z1 is less than 30 mm
x2 is less than 80 mm
y2 is less than 140 mm
xd is at least 60 mm
yd is at least 80 mm This embodiment provides an apparatus 14 having a body volume of less than 552 000 mm³, and the display 106 has a display area of at least 4800 mm².

According to another embodiment the apparatus 14 has a body volume of less than 1006 250 mm², and said display has a display area of at least 4800 mm². According to another embodiment the apparatus 14 has a body volume of less than 800 000 mm².

The invention claimed is:

1. An apparatus for analysing the condition of a machine having a rotating shaft, comprising:

at least one input for receiving measurement data from a sensor for surveying a measuring point of the machine, said measurement data being dependent on rotation of said shaft;

data processing means for processing condition data dependent on said measurement data, said data processing means comprising means for performing a plurality of condition monitoring functions (F1, F2,Fn), wherein at least one of said plurality of condition monitoring functions (F1, F2, Fn) is a restricted function having a disabled state and an enabled state, said disabled state prohibiting complete execution of said condition monitoring function, and said enabled state allowing execution;

wherein the apparatus is arranged to allow a limited amount of use of the at least one restricted condition monitoring function; and wherein at least one of said plurality of condition monitoring functions (F1, F2, Fn) is an unrestricted function;

wherein the apparatus further comprises:

a clock functionality for providing date information; and a state control functionality for changing the state of an individual selected condition monitoring function between the disabled state and the enabled state;

means for receiving a key comprising a code for enabling a selected restricted condition monitoring function from a first date until a second date;

a verification procedure for ascertaining whether a received key is valid or invalid;

wherein said state control functionality cooperates with said clock functionality to change the state of the restricted condition monitoring function associated with the received key from the disabled state to the enabled state at said first date in response to reception of said key if the verification procedure indicates that the received key is valid so as to allow said limited amount of use of the at least one restricted condition monitoring function; and wherein said state control functionality cooperates with said clock functionality to change the state of the enabled restricted condition monitoring function associated with the received key from the enabled state to the disabled state to at said second date so as to end said limited use of the at least one restricted condition monitoring function.

2. The apparatus according to claim 1, wherein:

said received key includes a first checksum;

said key verification procedure is adapted to retrieve a first code from a memory of the client part apparatus;

said key verification procedure is adapted to generate a second checksum in response to the retrieved first code and content of the request using a certain mathematical algorithm;

said key verification procedure is adapted to compare said first checksum as received in said key with said second checksum; and said key verification procedure is adapted to accept the received key as valid when said first checksum is identical to said second checksum.

3. The apparatus according to claim 1, wherein at least one of said plurality of condition monitoring functions is an unrestricted function; and wherein the apparatus is arranged to allow execution of the at least one unrestricted function irrespective of amount of use of the at least one unrestricted function when the at least one unrestricted function is enabled.

4. The apparatus according to claim 1, wherein said plurality of condition monitoring functions includes at least two functions selected from the group consisting of: vibration analysis, temperature analysis, shock pulse measuring, spectrum analysis of shock pulse measurement data, Fast Fourier Transformation of vibration measurement data, graphical presentation of condition data on a user interface, storage of condition data in a writeable information carrier on said machine, storage of condition data in a writeable information carrier in said apparatus, tachometering, imbalance detection, misalignment detection.

5. The apparatus according to claim 1, wherein said plurality of condition monitoring functions includes a function for imbalance detection.

6. The apparatus according to claim 1, wherein said plurality of condition monitoring functions includes a function for balancing.

7. The apparatus according to claim 1, wherein said plurality of condition monitoring functions includes a function for misalignment detection.

8. The apparatus according to claim 7, wherein said plurality of condition monitoring functions includes a function for alignment.

9. An apparatus for analysing the condition of a machine having a rotating shaft, comprising:

at least one input for receiving measurement data from a sensor for surveying a measuring point of the machine;

said measurement data being dependent on rotation of said shaft;

data processing means for processing condition data dependent on said measurement data, said data processing means comprising means for performing a plurality of condition monitoring functions, wherein at least one of said plurality of condition monitoring functions is a restricted function having a disabled state and an enabled state, said disabled state prohibiting complete execution of said condition monitoring function, and said enabled state allowing execution, and wherein the apparatus is arranged to allow a limited amount of use of the at least one restricted condition monitoring function;

a clock functionality for providing time and date information;

a state control routine for changing the state of an individual selected condition monitoring function between the disabled state and the enabled state;

means for receiving a key comprising a code for enabling a selected restricted condition monitoring function for a certain duration of time from a certain date; and a verification procedure for ascertaining whether a received key is valid or invalid;

wherein said state control routine cooperates with said clock functionality to change the state of the restricted condition monitoring function associated with the received key from the disabled state to the enabled state at said certain date in response to reception of said key if the verification procedure indicates that the received key is valid so as to allow said limited amount of use of the at least one restricted condition monitoring function; and wherein said state control routine cooperates with said clock functionality to change the state of the enabled restricted condition monitoring function associated with the received key from the enabled state to the disabled state when said clock functionality indicates that the certain duration of time has passed so as to end said limited use of the at least one restricted condition monitoring function.

10. The apparatus according to claim 9, wherein said plurality of condition monitoring functions (F1, F2,Fn) includes at least two functions selected from the group consisting of: vibration analysis, temperature analysis, shock pulse measuring, spectrum analysis of shock pulse measurement data, Fast Fourier Transformation of vibration measurement data, graphical presentation of condition data on a user interface, storage of condition data in a writeable information carrier on said machine, storage of condition data in a writeable information carrier in said apparatus, tachometering, imbalance detection, misalignment detection.

11. The apparatus according to claim 9, wherein said plurality of condition monitoring functions (F1, F2,Fn) includes a function for imbalance detection.

12. The apparatus according to claim 9, wherein said plurality of condition monitoring functions (F1, F2,Fn) includes a function for balancing.

13. The apparatus according to claim 9, wherein said plurality of condition monitoring functions (F1, F2,Fn) includes a function for misalignment detection.

14. The apparatus according to claim 13, wherein said plurality of condition monitoring functions (F1, F2,Fn) includes a function for alignment.

15. The apparatus according to claim 9, wherein:

said received key includes a first checksum;

said key verification procedure is adapted to retrieve a first code from a memory of the client part apparatus;

said key verification procedure is adapted to generate a second checksum in response to the retrieved first code and content of the request using a certain mathematical algorithm;

said key verification procedure is adapted to compare said first checksum as received in said key with said second checksum; and said key verification procedure is adapted to accept the received key as valid when said first checksum is identical to said second checksum.

16. The apparatus according to claim 9, wherein:
at least one of said plurality of condition monitoring functions is an unrestricted function; and
the apparatus is arranged to allow execution of the at least one unrestricted function irrespective of amount of use of the at least one unrestricted function when the at least one unrestricted function is enabled.

17. A method of operating a system for analysing the condition of a machine having a rotating shaft and a measuring point, the system comprising:
a client part;
a supplier part; and
means for exchanging information between said client part and said supplier part;
wherein said client part comprises:
at least one sensor attachable on or at said measuring point for generating said measurement data dependent on rotation of said shaft; and
an apparatus connectable to said at least one sensor for analysing the condition of the machine on the basis of said measurement data, said apparatus comprising:
a data processing means for processing condition data dependent on said measurement data, said data processing means comprising means for performing a plurality of condition monitoring functions, wherein at least one of said plurality of condition monitoring functions is a restricted function having a disabled state and an enabled state, said disabled state prohibiting complete execution of said condition monitoring function, and said enabled state allowing execution, wherein the apparatus is arranged to allow a limited amount of use of the at least one restricted condition monitoring function;
a clock functionality for providing date information;
a state control routine for changing the state of an individual selected condition monitoring function between the disabled state and the enabled state;
a communication port coupled to said data processing means; and
a user interface coupled to said data processing means for enabling user interaction;
wherein the method comprises:
displaying a list of available functions via the user interface with an indication about status for the displayed functions;
allowing a user to select at least one restricted condition monitoring function;
generating a request for enablement of said at least one selected restricted condition monitoring function so that said request includes information indicative of said at least one restricted condition monitoring function and/or so that said request includes information indicative of said apparatus;
supplying said request on said communication port for delivery to said supplier part;
receiving said request at said supplier part;
establishing, at said supplier part, whether to grant said request;
delivering, from said supplier part, a key comprising a code for enabling the selected restricted condition monitoring function from a first date until a second date when said establishing step results in a grant of said request;

receiving said key at said client part;
performing a key verification procedure at said client part;
causing said state control routine to cooperate with said clock functionality to change the state of the restricted condition monitoring function associated with the received key from the disabled state to the enabled state at said first date in response to reception of said key if the verification procedure indicates that the received key is valid so as to allow said limited amount of use of the at least one restricted condition monitoring function; and
causing said state control routine to cooperate with said clock functionality to change the state of the enabled restricted condition monitoring function associated with the received key from the enabled state to the disabled state at said second date so as to end said limited use of the at least one restricted condition monitoring function.

18. The method according to claim 17, further comprising the steps of:
generating a first code in accordance with a certain mathematical algorithm; and
storing said first code in a memory of the client part apparatus and in a database at the supplier part;
wherein said steps of generating a first code and storing the first code are performed before the step of generating a request for enablement of said at least one selected restricted condition monitoring function.

19. The method according to claim 18, further comprising the steps of:
retrieving, after receiving said request at said supplier part, said first code from said database at the supplier part;
generating, at said supplier part, a first checksum in response to the retrieved first code and content of the request using a certain mathematical algorithm; and
including said checksum in said key before delivering said key from said supplier part.

20. The method according to claim 19, wherein said key verification procedure, at said client part, includes the steps of:
retrieving, after receiving said key at said client part, said first code from said memory of the client part apparatus;
generating, at said client part, a second checksum in response to the retrieved first code and content of the request using said certain mathematical algorithm;
comparing said first checksum as received in said key with said second checksum; and
accepting the received key as valid when said first checksum is identical to said second checksum.

21. The method according to claim 17, wherein said request includes payment information; and
wherein the step of establishing, at said supplier part, whether to grant said request includes an evaluation of the payment information.

22. A method of operating a system for analysing the condition of a machine having a rotating shaft and a measuring point, the system comprising:
a client part;
a supplier part; and
means for exchanging information between said client part and said supplier part; said client part comprising:
at least one sensor attachable on or at said measuring point for generating said measurement data dependent on rotation of said shaft; and an apparatus connectable to said at least one sensor for analysing the condition of the machine on the basis of said measurement data, said apparatus comprising:
- a data processing means for processing condition data dependent on said measurement data, said data processing means comprising means for performing a plurality of condition monitoring functions, wherein at least one of said plurality of condition monitoring functions is a restricted function having a disabled state and an enabled state, said disabled state prohibiting complete execution of said condition monitoring function, and said enabled state allowing execution, wherein the apparatus is arranged to allow a limited amount of use of the at least one restricted condition monitoring function; and
- a clock functionality for providing time and date information;
- a state control routine for changing the state of an individual selected condition monitoring function between the disabled state and the enabled state; and
- a communication port coupled to said data processing means; and
- a user interface coupled to said data processing means for enabling user interaction;

the method comprising:
- displaying a list of available functions via the user interface with an indication about status for the displayed functions;
- allowing a user to select at least one restricted condition monitoring function;
- generating a request for enablement of said at least one selected restricted condition monitoring function so that said request includes information indicative of said at least one restricted condition monitoring function and/or so that said request includes information indicative of said apparatus;
- supplying said request on said communication port for delivery to said supplier part;
- receiving said request at said supplier part;
- establishing, at said supplier part, whether to grant said request;
- delivering, from said supplier part, a key comprising a code for enabling the selected restricted condition monitoring function for a certain duration starting from a first date when said establishing step results in a grant of said request;
- receiving said key at said client part;
- performing a key verification procedure at said client part;
- causing said state control routine to cooperate with said clock functionality to change the state of the restricted condition monitoring function associated with the received key from the disabled state to the enabled state at said first date in response to reception of said key if the verification procedure indicates that the received key is valid so as to allow said limited amount of use of the at least one restricted condition monitoring function; and
- causing said state control routine to cooperate with said clock functionality to change the state of the enabled restricted condition monitoring function associated with the received key from the enabled state to the disabled state when said clock functionality indicates that the certain duration of time has passed so as to end said limited use of the at least one restricted condition monitoring function.

23. The method according to claim 22, further comprising the steps of:
- generating a first code in accordance with a certain mathematical algorithm; and
- storing said first code in a memory of the client part apparatus and in a database at the supplier part;
- wherein said steps of generating a first code and storing the first code are performed before the step of generating a request for enablement of said at least one selected restricted condition monitoring function.

24. The method according to claim 23, further comprising the steps of:
- retrieving, after receiving said request at said supplier part, said first code from said database at the supplier part;
- generating, at said supplier part, a first checksum in response to the retrieved first code and content of the request using a certain mathematical algorithm; and
- including said checksum in said key before delivering said key from said supplier part.

25. The method according to claim 24, wherein said key verification procedure, at said client part, includes the steps of:
- retrieving, after receiving said key at said client part, said first code from said memory of the client part apparatus;
- generating, at said client part, a second checksum in response to the retrieved first code and content of the request using said certain mathematical algorithm;
- comparing said first checksum as received in said key with said second checksum; and
- accepting the received key as valid when said first checksum is identical to said second checksum.

26. The method according to claim 22, wherein said request includes payment information; and
wherein the step of establishing, at said supplier part, whether to grant said request includes an evaluation of the payment information.

27. A method of operating a system for analysing the condition of a machine having a rotating shaft and a measuring point, the system comprising:
- a client part;
- a supplier part; and
- means for exchanging information between said client part and said supplier part;
- said client part comprising:
- at least one sensor attachable on or at said measuring point for generating said measurement data dependent on rotation of said shaft; and
- an apparatus connectable to said at least one sensor for analysing the condition of the machine on the basis of said measurement data, said apparatus comprising:
  - data processing means for processing condition data dependent on said measurement data, said data processing means comprising means for performing a plurality of condition monitoring functions, said plurality of condition monitoring functions being at least partly embodied by computer program code, wherein at least one of said plurality of condition monitoring functions is an unrestricted function having a disabled state and an enabled state, said disabled state prohibiting complete execution of said condition monitoring function;
  - a first memory location storing program code for controlling the apparatus to perform a plurality of basic operations;

a second memory location storing said at least one unrestricted condition monitoring function as a disabled version of computer program code;

a third memory location for storing at least one unrestricted condition monitoring function as an enabled version of computer program code, wherein the apparatus is arranged to allow execution of the at least one unrestricted function irrespective of amount of use of the at least one unrestricted function when the at least one unrestricted function is enabled, wherein said first memory location includes a state control routine for changing the state of a condition monitoring function between the disabled state and the enabled state;

a communication port coupled to said data processing means; and a user interface coupled to said data processing means for enabling user interaction;

the method comprising:

displaying a list of available condition monitoring functions via the user interface;

indicating, for each of the listed condition monitoring functions, whether it is an enabled unrestricted condition monitoring function or a disabled unrestricted condition monitoring function;

allowing a user to select at least one disabled unrestricted condition monitoring function;

generating a request for enablement of said at least one selected disabled unrestricted condition monitoring function so that said request includes information indicative of said at least one disabled unrestricted condition monitoring function and/or so that said request includes information indicative of said apparatus;

supplying said request on said communication port (16) for delivery to said supplier part;

receiving said request at said supplier part;

establishing, at said supplier part, whether to grant said request;

delivering, from said supplier part, a key comprising a code for enabling the selected condition monitoring function when said establishing step results in a grant of said request;

receiving said key at said client part;

performing a key verification procedure at said client part; and causing said state control routine to change the state of the selected unrestricted condition monitoring function associated with the received key from the disabled state to the enabled state in response to reception of said key if the verification procedure indicates that the received key is valid.

28. The method according to claim 27, wherein said disabled version of computer program code is disabled by means of data encryption so as to prohibit complete execution of said disabled condition monitoring function; and wherein said change of the state of the selected condition monitoring function from the disabled state to the enabled state includes decrypting said disabled version of computer program code so as to achieve an executable version of the selected condition monitoring function computer program code.

29. The method according to claim 27, wherein each of said plurality of condition monitoring functions in said second memory location (90) is an unrestricted condition monitoring function so as to allow execution of the unrestricted condition monitoring function irrespective of amount of use of the unrestricted condition monitoring function when the unrestricted condition monitoring function has become enabled, and preventing complete execution of the unrestricted condition monitoring function when the unrestricted condition monitoring function is disabled.

30. The method according to claim 27, further comprising the steps of:

generating a first code in accordance with a certain mathematical algorithm; and storing said first code in a memory of the client part apparatus and in a database at the supplier part;

wherein said steps of generating a first code and storing the first code are performed before the step of generating a request for enablement of said at least one selected restricted condition monitoring function.

31. The method according to claim 30, further comprising the steps of:

retrieving, after receiving said request at said supplier part, said first code from said database at the supplier part;

generating, at said supplier part, a first checksum in response to the retrieved first code and content of the request using a certain mathematical algorithm; and including said checksum in said key before delivering said key from said supplier part.

32. The method according to claim 31, wherein said key verification procedure, at said client part, includes the steps of:

retrieving, after receiving said key at said client part, said first code from said memory of the client part apparatus;

generating, at said client part, a second checksum in response to the retrieved first code and content of the request using said certain mathematical algorithm;

comparing said first checksum as received in said key with said second checksum; and accepting the received key as valid when said first checksum is identical to said second checksum.

33. The method according to claim 27, wherein said request includes payment information; and wherein the step of establishing, at said supplier part, whether to grant said request includes an evaluation of the payment information.

34. An apparatus for analysing the condition of a machine having a rotating shaft, comprising:

at least one input for receiving measurement data from a sensor for surveying a measuring point of the machine; said measurement data being dependent on rotation of said shaft;

data processing means for processing condition data dependent on said measurement data, said data processing means comprising means for performing a plurality of condition monitoring functions, said plurality of condition monitoring functions being at least partly embodied by computer program code, wherein at least one of said plurality of condition monitoring functions is an unrestricted function having a disabled state and an enabled state, said disabled state prohibiting complete execution of said condition monitoring function, wherein the apparatus is arranged to allow execution of the at least one unrestricted function irrespective of amount of use of the at least one unrestricted function when the at least one unrestricted function is enabled;

a first memory location storing program code for controlling the apparatus to perform a plurality of basic operations;

a second memory location storing at least one unrestricted condition monitoring function as a disabled version of computer program code;

a third memory location for storing at least one unrestricted condition monitoring function as an enabled version of computer program code, wherein the apparatus is arranged to allow execution of the at least one enabled condition monitoring function;

wherein said first memory location includes a state control routine for changing the state of a condition monitoring function between the disabled state and the enabled state;

a user interface for presenting a listing of a plurality of condition monitoring functions so as to allow an operator to request the apparatus to perform a condition monitoring function by selecting a condition monitoring function;

means for checking whether a selected condition monitoring function is a disabled unrestricted condition monitoring function or an enabled unrestricted condition monitoring function;

means for causing the apparatus to perform the selected unrestricted condition monitoring function when the selected condition monitoring function is an enabled unrestricted condition monitoring function;

means for allowing an operator to indicate a desire to enable the selected unrestricted condition monitoring function when the selected condition monitoring function is a disabled unrestricted condition monitoring function;

means for generating a request message so that it includes information identifying said selected disabled unrestricted condition monitoring function;

means for transmitting said request message for delivery to a supplier part computer;

means for receiving a key associated with a condition monitoring function; and a verification procedure for ascertaining whether the received key is valid or invalid;

wherein said state control routine is adapted to change the state of the said selected unrestricted condition monitoring function from the disabled state to the enabled state in response to reception of said key associated with said selected unrestricted condition monitoring function when the verification procedure indicates that the received key is valid.

35. The apparatus according to claim 34, wherein said disabled version of computer program code is disabled by means of data encryption so as to prohibit complete execution of said disabled condition monitoring function; and wherein said state control routine includes a decryption routine adapted to control the apparatus to locate the condition monitoring function associated with the received key among the disabled condition monitoring functions in said second memory location and to perform a decryption routine so as to decrypt the encrypted condition monitoring function such that an enabled executable version of the selected condition monitoring function is obtained.

36. The apparatus according to claim 35, wherein said decryption routine is adapted to store the enabled executable version of the selected condition monitoring function in the third memory location.

37. The apparatus according to claim 34, wherein:
said received key includes a first checksum;
said key verification procedure is adapted to retrieve a first code from a memory of the client part apparatus;
said key verification procedure is adapted to generate a second checksum in response to the retrieved first code and content of the request using a certain mathematical algorithm;
said key verification procedure is adapted to compare said first checksum as received in said key with said second checksum; and
said key verification procedure is adapted to accept the received key as valid when said first checksum is identical to said second checksum.

38. The apparatus according to claim 34, wherein at least one of said plurality of condition monitoring functions is a restricted function; and
wherein the apparatus is arranged to allow a limited amount of use of the at least one restricted condition monitoring function.

39. The apparatus according to claim 34, wherein said plurality of condition monitoring functions includes at least two functions selected from the group consisting of: vibration analysis, temperature analysis, shock pulse measuring, spectrum analysis of shock pulse measurement data, Fast Fourier Transformation of vibration measurement data, graphical presentation of condition data on a user interface, storage of condition data in a writeable information carrier on said machine, storage of condition data in a writeable information carrier in said apparatus, tachometering, imbalance detection, misalignment detection.

40. The apparatus according to claim 34, wherein said plurality of condition monitoring functions includes a function for imbalance detection.

41. The apparatus according to claim 34, wherein said plurality of condition monitoring functions includes a function for balancing.

42. The apparatus according to claim 34, wherein said plurality of condition monitoring functions includes a function for misalignment detection.

43. The apparatus according to claim 42, wherein said plurality of condition monitoring functions includes a function for alignment.

* * * * *